United States Patent
Mahoney et al.

(10) Patent No.: US 11,934,892 B2
(45) Date of Patent: Mar. 19, 2024

(54) GLOBAL ACCOUNT IDENTIFIER TRANSLATION

(71) Applicant: Synchrony Bank, Stamford, CT (US)

(72) Inventors: William Mahoney, Stamford, CT (US); Chidhambaram Pillai, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

(21) Appl. No.: 18/330,899

(22) Filed: Jun. 7, 2023

(65) Prior Publication Data

US 2023/0393908 A1 Dec. 7, 2023

Related U.S. Application Data

(60) Provisional application No. 63/349,669, filed on Jun. 7, 2022.

(51) Int. Cl.
*G06F 9/54* (2006.01)
(52) U.S. Cl.
CPC .............. *G06F 9/541* (2013.01); *G06F 9/543* (2013.01)
(58) Field of Classification Search
None
See application file for complete search history.

(56) References Cited

U.S. PATENT DOCUMENTS

| | | | | |
|---|---|---|---|---|
| 2009/0172042 | A1* | 7/2009 | Bracha | G06Q 10/06 |
| 2012/0330769 | A1* | 12/2012 | Arceo | G06Q 20/4014 |
| | | | | 455/411 |
| 2015/0154602 | A1* | 6/2015 | Dixon | G06Q 20/027 |
| | | | | 705/16 |
| 2019/0068728 | A1* | 2/2019 | Schneider | H04L 67/535 |

FOREIGN PATENT DOCUMENTS

CN 111221490 A * 6/2020

OTHER PUBLICATIONS

Cao et al.; English translation of CN 111221490A; Jun. 2, 2020. (Year: 2020).*

* cited by examiner

*Primary Examiner* — Umut Onat
(74) *Attorney, Agent, or Firm* — Polsinelli LLP

(57) ABSTRACT

Systems and methods for global account identifier translation. Embodiments described herein include a service provider system configured to receive API calls that include an initial identifier, which may be issued by the service provider system and/or associated with a third-party entity. The service provider system may use the initial identifier from the API call to obtain a primary identifier associated with an account. The primary identifier is then used to service the API call to obtain an API call result. The API call result may be transmitted to the device from which the API call was received.

30 Claims, 9 Drawing Sheets

GLOBAL ACCOUNT IDENTIFIER TRANSLATION

CROSS-REFERENCE TO RELATED APPLICATIONS

The present patent application claims the priority benefit of U.S. provisional patent application No. 63/349,669 filed Jun. 7, 2022, the disclosures of which are incorporated by reference herein.

FIELD

The present disclosure relates to systems and methods for translating initial account identifiers, which may be included in Application Programming Interface (API) calls, to primary account identifiers, which may be needed to service received API calls.

SUMMARY

Disclosed embodiments may provide a system for generating initial identifiers that can be used to access user accounts without exposing primary identifiers associated with these user accounts. The system can generate and provide these initial identifiers according to any detected or otherwise known characteristics associated with the user accounts, the user applications to which these initial identifiers are to be provided, and/or the user devices that implement these user applications. This may allow these user applications to provide, in place of a primary identifier associated with a user account, an initial identifier through one or more API calls to a service provider in order to obtain any required information associated with the user account without the primary identifier being exposed to the user applications or any entity external to the service provider that maintains the user account.

According to some embodiments, a computer-implemented method is provided. The computer-implemented method comprises receiving an application programming interface (API) call. The API call includes a request to perform an API action and an initial identifier. The computer-implemented method further comprises identifying an initial identifier type corresponding to the initial identifier. The computer-implemented method further comprises accessing an identifier translation data structure associated with the initial identifier type. The computer-implemented method further comprises obtaining a primary identifier from the identifier translation data structure using the initial identifier. The computer-implemented method further comprises performing the API call using the primary identifier to obtain an API call result.

In some embodiments, the computer-implemented method further comprises, before receiving the API call, generating the initial identifier based on authentication of a user of a user application. The computer-implemented method further comprises issuing the initial identifier. When the initial identifier is received at the user application, the user application uses the initial identifier to request the API call.

In some embodiments, the initial identifier includes a universally unique identifier (UUID).

In some embodiments, the initial identifier is associated with an expiration time.

In some embodiments, the initial identifier expires when a user session associated with the initial identifier expires.

In some embodiments, the computer-implemented further comprises, after servicing the API call, determining that the initial identifier is expired. The computer-implemented method further comprises issuing an updated initial identifier when a user session associated with the initial identifier remains active.

In some embodiments, the initial identifier is associated with a user account of a user. Further, the user account is maintained by a separate entity.

In some embodiments, the API call includes a request for information. Further, computer-implemented method further comprises obtaining the requested information as the API call result. The computer-implemented method further comprises transmitting the API call result to a user device. The API call result includes the requested information and the initial identifier.

In some embodiments, the API call includes a request to update information associated with a user. Further, the computer-implemented method further comprises accessing the information. The computer-implemented method further comprises performing the requested update of the information. The computer-implemented method further comprises transmitting the API call result to a user device. The API call result includes an update confirmation and the initial identifier.

In some embodiments, the primary identifier includes a primary account number associated with a user account.

In some embodiments, the API call result includes updated information associated with a user account corresponding to the primary identifier.

In some embodiments, the API call result includes retrieved information associated with a user account corresponding to the primary identifier.

In some embodiments, the API call result includes making a payment associated with a user account corresponding to the primary identifier.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment", one or more embodiments, or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1A:
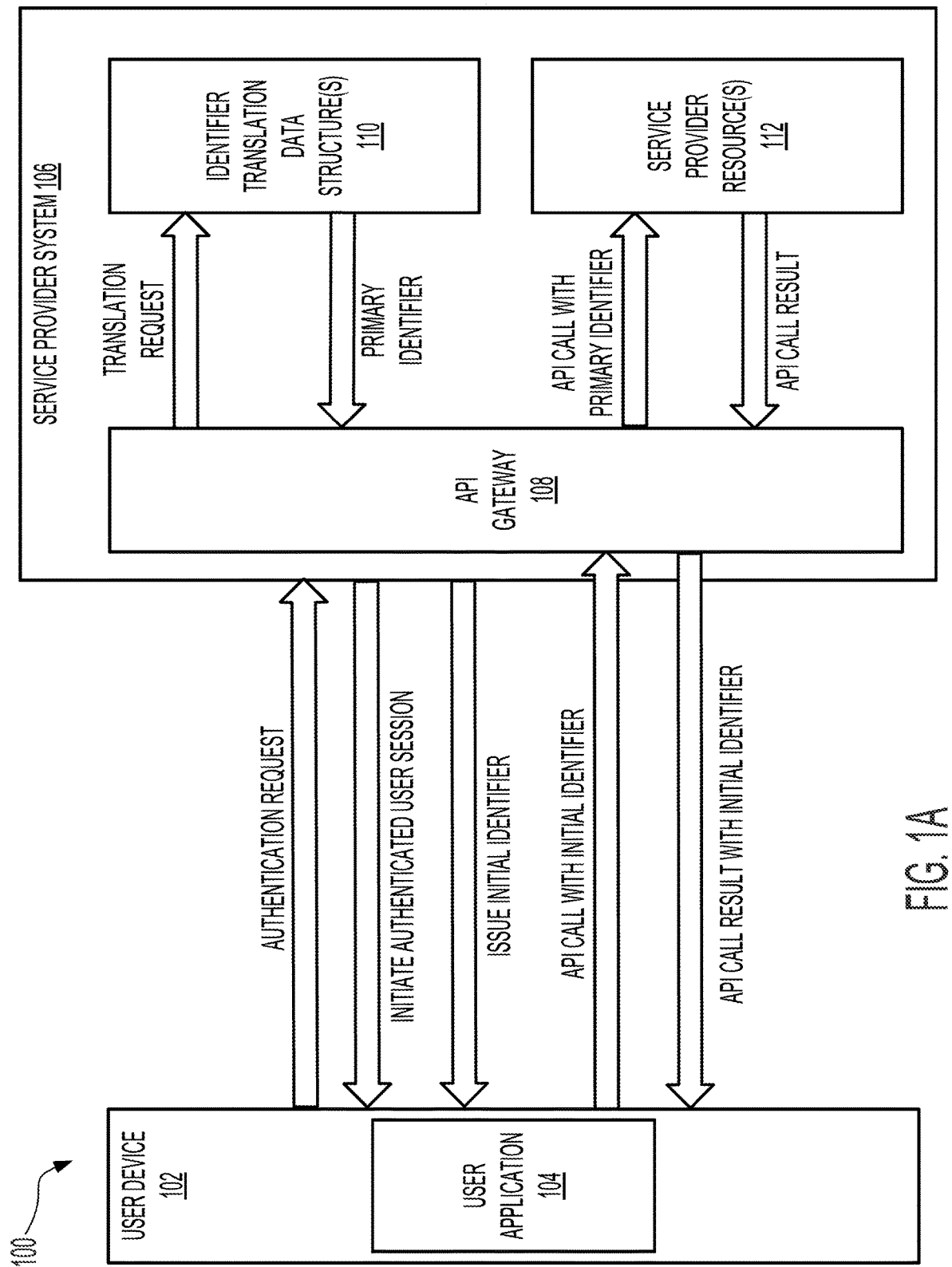
FIGS. 1A-1B show an illustrative example of an environment 100 in which a user device interacts with a service provider system in order to make one or more API calls using an initial identifier that is translated by the service provider system into a primary identifier that is used to service the API call in accordance with one or more embodiments described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The words "exemplary" and "example" are used herein to mean "serving as an example, instance, or illustration." Any embodiment or design described herein as "exemplary" is not necessarily to be construed as preferred or advantageous over other embodiments or designs.

Embodiments described herein provide a framework for a service provider system and a user application to interact using application programming interface (API) calls to one or more APIs of the service provider system from the user application. In one or more embodiments, a given user may have any number of accounts that are provided by a service provider (e.g., a financial services provider). The one or more accounts may each be associated with a primary identifier (i.e., a primary account identifier), such as, for example, a primary account number. However, the primary identifier may be deemed as sensitive information. For example, the primary account number may be information subject to the Payment Card Industry Data Security Standard (PCI DSS). As such, the primary identifier should be secured (i.e., not exposed). In one or more embodiments, the primary identifier is secured, at least in part, by not sharing or otherwise exposing the primary identifier outside a service provider system associated with and maintained by the service provider.

In one or more embodiments, the service provider system exposes any number of APIs for access by third party applications, or remote applications provided by the service provider. Such APIs may be accessed using API calls. The APIs may be used to obtain, update, delete, etc. information associated with one or more accounts that a user has with the service provider. In one or more embodiments, in order to make API calls to access a given account, the service provider needs to discern what account a user is attempting to access when a user application used by the user makes an API call. However, as discussed above, in one or more embodiments, the primary identifier of the account is not exposed outside the service provider system. Therefore, embodiments described herein include functionality to receive API calls having an initial identifier, and to translate the initial identifier into the primary identifier to be able to service the API call.

Figure 1B:
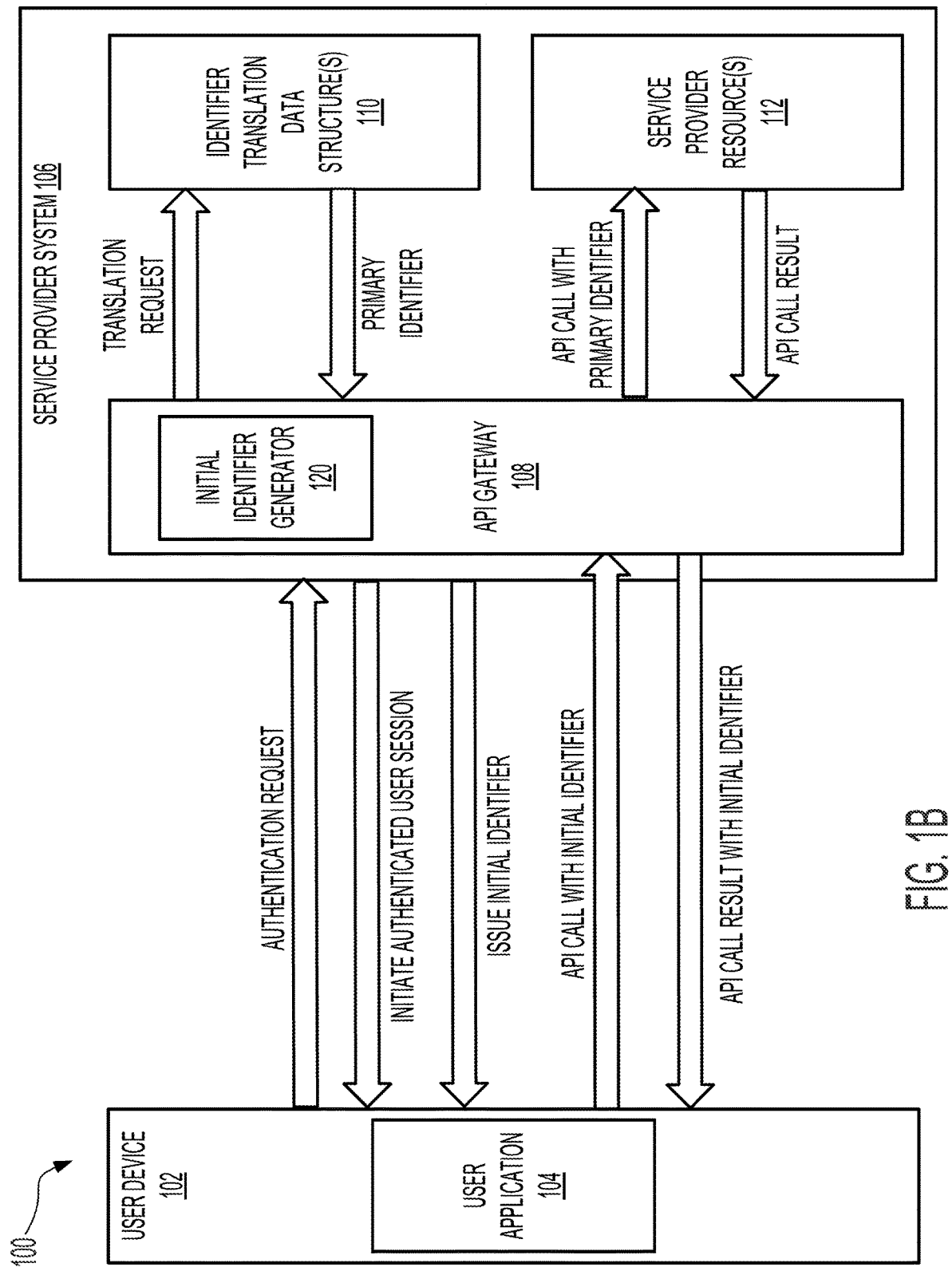

FIGS. 1A-1B show an illustrative example of an environment 100 in which a user device 102 interacts with a service provider system 106 in order to make one or more API calls. The user device 102 may be a computing device such as the computing device 802 described herein at least in connection with FIG. 8. The user device 102 may be, for example, a laptop computer, a desktop computer, a smartphone, a tablet, a smart watch, or any other type of computing device such as those described herein. The user device 102 may be a device owned by or otherwise provided to an individual user (not shown). The user device 102 may be a device owned by or otherwise controlled by an entity (e.g., a retailer) that has a relationship with the service provider associated with the service provider system 106. As an example, a retailer may have a physical establishment in which a user device 102 is in communication with the service provider system 106, and may be used to apply for credit, access account information, etc. Accordingly, the user device 102, within this physical establishment (e.g., a point-of-sale location, etc.), may be implemented through a kiosk or through existing point-of-sale devices, such as a checkout terminal.

In one or more embodiments, the user device 102 includes any number of applications, such as the user application 104. The user application 104 may be an application or other executable process executing on the user device 102. The user application may be a single page application (SPA) executing in a browser application of the user device 102, a native application executing on the user device 102, a progressive web application (PWA), a multi-page application (MPA), etc. The user application 104 may be any other form of an application or program without departing from the scope of embodiments described herein. The user application 104 may be provided by a service provider associated with service provider system 106, or may be provided from any other entity, such as a third-party entity that has a relationship with the service provider associated with the service provider system 106.

Figure 8:
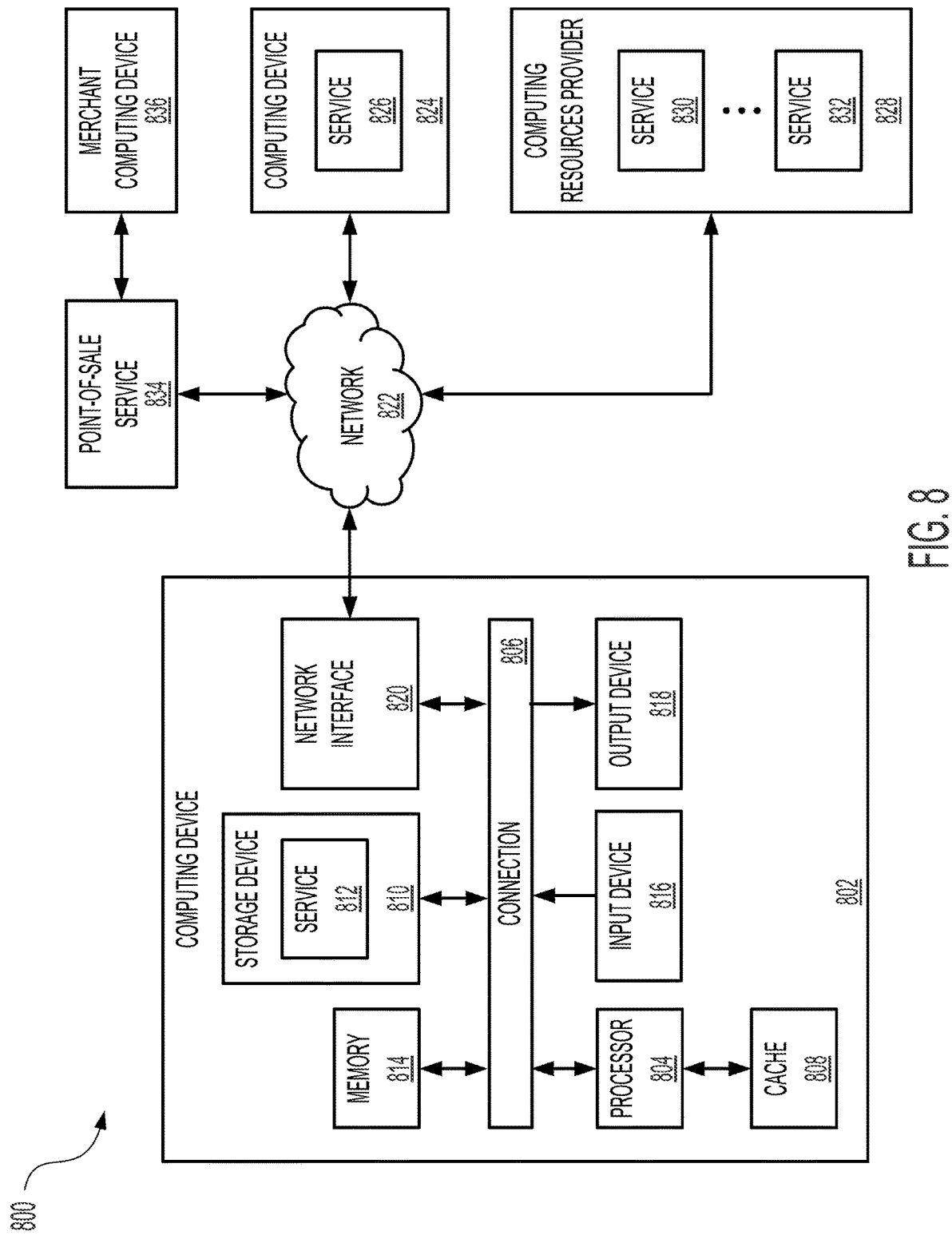
FIG. 8 shows a computing system architecture including various components in electrical communication with each other using a connection in accordance with various embodiments.

The service provider system 106 may be one or more computing devices such as the computing device 802 described herein at least in connection with FIG. 8. As an example, the service provider system 106 may be one or more server computing devices controlled or otherwise used by a service provider (not shown). As used herein, a service provider may be any entity that provides services of any type. As an example, a service provider may be a financial institution, retailer, etc. that provides various services to users having one or more accounts with the service provider (e.g., account access, account summary information, account update capabilities, account details information, upcoming payment deadlines, etc.).

In one or more embodiments, the service provider system 106 maintains or otherwise exposes one or more APIs to which the user application 104 may make API calls via an API gateway 108. The API gateway 108 may be implemented on one or more computing devices of the service provider system 106, or any portion thereof. Alternatively, the API gateway 108 may be implemented as an application or other executable process on one or more computing devices of the service provider system 106. In one or more embodiments, the API gateway 108 exposes one or more APIs of the service provider system 106 to user applications, so that the user applications may, via the API gateway 108, request the service provider to perform various actions, functionalities, etc. In one or more embodiments, the API gateway 108 is configured to service API calls received from user applications, such as, for example, user application 104. In one or more embodiments, an API call is a request made by the user application 104 to the API gateway 108 of the service provider system 106 to perform one or more API actions, such as retrieving information, updating information, deleting information, adding information, performing various operations, methods, functions, etc.

In one or more embodiments, prior to the user application 104 making API calls to the API gateway 108, an authenticated user application session is initiated. In one or more embodiments, to initiate an authenticated user application session, the user application 104 transmits an authentication request to the service provider system. In one or more embodiments, an authentication request includes any information which may be subjected to a verification process by the service provider system 106 in order to authenticate the user (not shown) of the user application 104. An authentication request may include an identifier associated with a user (e.g., username, email address, etc.) and one or more other information items that allow the service provider system 106 to verify the identity of the user. As an example, the service provider system may employ single factor authentication and require a username and password. As another example, the authentication request may include biometric information (e.g., facial scan, fingerprint, iris scan, etc.) of the user. An authentication request may include any number of discrete steps without departing from the scope of embodiments described herein. As an example, a user, via the user application 104, may provide a username and password as part of the authentication request to the service provider system 106. However, the service provider system 106 may additionally check whether the user device 102 on which the user application 104 executes is recognized by the service provider system 106 (e.g., the user has previously been authenticated when using the user application 104 on the user device 102). When the user device 102 is not recognized, the service provider system 106 may require additional information to authenticate the user (e.g., multi-factor authentication), such as providing a unique code provided to a separate device associated with the user (e.g., a user mobile device (not shown)). In one or more embodiments, the authentication is performed by the service provider system 106 using API calls to an authentication service API (not shown) of the service provider system 106.

In one or more embodiments, once the service provider system 106 successfully verifies the authentication request, and authenticates the user, the service provider system 106 may issue an initial identifier to the user application 104. In one or more embodiments, an initial identifier is an identifier that the user application 104 will use in an account identifier field of API calls when making such calls to access an account of an authenticated user, thereby avoiding the need to use the primary identifier associated with a given account, which is not shared outside the service provider system. A given user may have more than one account with the service provider system 106, which the user accesses via the user application 104. In such scenarios, the user may be issued a separate initial identifier for each account, to be used separately in API calls, depending on which account the user application attempts to access via an API call.

The one or more initial identifiers may each be any information item that uniquely, or substantially uniquely, identifies a user account from among user accounts maintained by the service provider system 106. As an example, the initial identifier may be a string of alphanumeric or other special characters (e.g., "-"). In one or more embodiments, the initial identifier is a universally unique identifier (UUID), which may also be referred to as a globally unique identifier (GUID). A UUID may be generated using any suitable technique for generating a unique identifier. A UUID may not be mathematically guaranteed to be unique, but may have a probability of being not unique that is low enough to be considered unique within the context of accounts maintained by the service provider system 106. As an example, the UUID generated by the service provider system 106 may be a version 4 UUID, which includes thirty-two hexadecimal characters representing 128 bits. In one or more embodiments, the bits that comprise the version 4 UUID are randomly generated. Therefore, there are $2^{128}$ possible combinations of bits, leaving the probability that two such generated UUIDs are the same very low within reasonable time and computation power constraints. A UUID used as the initial identifier may be generated using other techniques for UUID generation. For example, a version 1 UUID is generated based on a Media Access Control (MAC) address of a computing device (or component therein) in combination with an exact time of generation, which would not be duplicated unless the two UUIDs were generated using the same device, having the same MAC address, at the same time. Any other technique for generating a UUID may be used without departing from the scope of embodiments described herein.

In one or more embodiments, the initial identifier is associated with an expiration time. In one or more embodiments, an expiration time for an initial identifier is an amount of time that the initial identifier may be used in API calls to access the account with which the initial identifier is associated. In one or more embodiments, after generating the initial identifier, the service provider system 106 may implement a technique for verifying whether the initial identifier has expired or otherwise becomes invalid for use by the user application 104 when making an API call. As an example, the service provider system 106 may initiate a timer associated with the initial identifier such that, when the timer expires (e.g., after 3600 seconds), the service provider system 106 no longer services API calls that use the initial identifier. As another example, the service provider system may record and store the time at which the initial identifier is generated, and, each time an API call is received that includes the initial identifier, use the generation time and the current time to determine if the expiration time for the initial identifier has been exceeded. As another example, if a user of the user application 104 logs out of the application, or is logged out due to inactivity, the initial identifier may be considered invalid, and the service provider system 106 will no longer service API calls made using the initial identifier. In one or more embodiments, in scenarios where one or more initial identifiers associated with a user session of the user application 104 expire, but that the user session remains active, the service provider system 106 may generate one or more new initial identifiers, and transmit the one or more new initial identifiers to the user application 104.

In an embodiment, the initial identifier is automatically expired once the initial identifier has been used in an API call. For example, when the service provider system 106, through the API gateway 108, receives an API call that uses the initial identifier, the service provider system 106 determines whether the initial identifier is currently associated with an account (e.g., has not expired or become invalid for use according to a pre-defined expiration time, as described above). If the initial identifier is currently associated with an account, the service provider system 106, through the API gateway 108, may process the API call as described herein. Further, the service provider system 106 may automatically disassociate the initial identifier included in the API call from the account such that the initial identifier can no longer be used in API calls, thereby expiring the initial identifier. In an embodiment, the service provider system 106 can define a limited number of uses for a particular initial identifier such that, if the initial identifier is included in API calls equaling the defined limited number of uses, the initial identifier may be automatically expired. In such embodiments, the service provider system 106 may log each API call received that includes the initial identifier and determine whether the number of times in which the initial identifier was used in API calls equals the defined limited number of uses for the initial identifier. Once the defined limited number of uses has been reached for the initial identifier, the service provider system 106 may automatically disassociate the initial identifier from the corresponding account.

In one or more embodiments, the service provider system 106 includes identifier translation data structure(s) 110. In one or more embodiments, the identifier translation data structure(s) 110 are one or more data structures of any type that store initial identifiers associated with primary identifiers. In one or more embodiments, as discussed above, internal to the service provider system 106, a given user account is associated with a primary identifier (e.g., a primary account number). In one or more embodiments, an initial identifier issued to a user application corresponding to a given user account is thus associated with the primary identifier for that account in the identifier translation data structure(s) 110. The identifier translation data structure(s) 110 may be stored in any form of storage, such as, for example, storage device 810 shown in FIG. 8 and described below. In one or more embodiments, when the service provider system 106 generates an initial identifier (e.g., a UUID with an associated expiration time and/or other expiration conditions) for a given user account, the service provider associates the initial identifier with the primary identifier for the same account, and stores the association in the identifier translation data structure(s) 110. In one or more embodiments, the initial identifier is generated dynamically in real-time when a user is authenticated, and the identifier translation data structure in which the association between the initial identifier and the primary identifier is stored is updated in real-time to store the association.

In one or more embodiments, in addition to issuing an initial identifier to the user application 104 and storing the association between the initial identifier and a primary identifier for a given user account in the identifier translation data structure(s) 110, the service provider system 106 may also perform any number of other steps as part of the authentication process. As an example, after authentication, the service provider system 106 may issue an access token to the user application 104. As another example, the service provider system 106 and the user application may exchange encryption keys for encrypting information transmitted between the user application 104 and the service provider system 106. Other actions may be included in the authentication process prior to the user application 104 being able to make API calls to the service provider system without departing from the scope of embodiments described herein.

In one or more embodiments, the user application 104 is configured to interact, at least in part, with the service provider system 106 via one or more APIs exposed by the service provider system 106 via the API gateway 108. To interact with the one or more APIs of the service provider system 106, the user application may make API calls to the API gateway 108 of the service provider system 106. In one or more embodiments, an API call is a request made to an API for one or more actions to be performed. Such actions may include, but are not limited to, obtaining information (e.g., accessing account information for one or more accounts), updating information, deleting information, executing a method, process, function, etc. As an example, the service provider may be an entity that provides any number of user accounts for credit cards, bank accounts, etc., and API calls may be made by user application 104 to the service provider system 106 to perform actions such as accessing account information, updating account information, viewing account summaries and account details, viewing payment history, viewing account balances, making payments, filing disputes, etc.

In one or more embodiments, an API call may include one or more fields or portions in which information is to be provided. One such field or portion is an account identifier field. In one or more embodiments, an account identifier field includes an account identifier that allows the service provider system receiving the API call to identify the account that the API call is being used to access by the user application. However, the primary account identifier identifying a user account with the service provider system may be deemed as sensitive information. For example, an account identifier may be information subject to the PCI DSS. Being sensitive information, in one or more embodiments, the service provider system assigns primary account identifiers to user accounts. In order to mitigate the risk that the primary identifier of a user account is exposed, the service provider does not provide the primary identifier to the user application 104, and instead issues the initial identifier, as described above. In one or more embodiments, the user application 104 uses the initial identifier in the account identifier field (i.e., not the primary identifier) of API calls when making API calls to the service provider system 106 to access user accounts.

In one or more embodiments, as discussed above, the user application 104 interacts, at least in part, with the service provider system 106 by making API calls to the API gateway 108 of the service provider system 106. In one or more embodiments, to make an API call, the user application 104 first assesses the API call to determine if any fields or portions of the API call are designated as requiring that the user application 104 provide an account identifier. In one or more embodiments, when one or more such fields or portions of an API call are identified, the user application 104 obtains the initial identifier, and transmits the API call with the initial identifier in the relevant one or more fields, as the user application 104 does not have the primary identifier associated with the user account for which the API call is being made.

In one or more embodiments, when the API gateway 108 receives the API call from the user application 104, the API gateway 108 may first validate that the user application 104 is allowed to make the API call. For example, the API gateway 108 may first validate that an access token included with the API call by the user application 104 is valid (e.g., the access token has not expired), and that the access token indicates that the user application has appropriate permissions to make the API call. In one or more embodiments, if the user application is not allowed to make the API call (e.g., if the access token is not valid and/or the access token indicates that the user application 104 is not allowed to make the API call), the API gateway does not service the API call. In such a scenario, the API gateway may transmit a denial to the user application 104 indicating that the API call cannot be made, and may also include information relating to the reason(s) for the denial (e.g., access token is expired). In one or more embodiments, when the API gateway 108 determines that the user application 104 is allowed to make the API call (e.g., that the access token is valid and that the user application 104 has permission to make the API call), the API gateway 108 determines whether the API call includes an account identifier field. In one or more embodiments, when the API call includes an account identifier field, the service provider system 106 obtains the initial identifier from the account identifier field.

In one or more embodiments, the API gateway 108 assesses the initial identifier to determine an initial identifier type. In one or more embodiments, an initial identifier may be issued by the service provider system 106 to the user application 104 after an authentication process, as described above. However, there may be any number of different types of initial identifiers, and each type may be associated with a separate identifier translation data structure of the identifier translation data structure(s) 110. Additionally, or alternatively, a user may have a user account with the service provider system 106 that is accessed through a user application provided by a third party for an account that is associated with the third party, and such an account may have an initial identifier (e.g., account number) provided by the third party. There may be any number of such third parties, and each may be associated with a separate identifier translation data structure of the identifier translation data structure(s) 110. Thus, identifying the type of an initial identifier may include determining that the initial identifier is associated with a third party. In one or more embodiments, identifying the type of initial identifier allows the service provider system to discern the appropriate identifier data structure of the identifier translation data structure(s) 110 to use for identifier translation. Although the above description contemplates separate identifier translation data structures for each type of initial identifier, one having skill in the art, and the benefit of this Detailed Description, will appreciate that any other division of the identifier translation data structure(s) 110 may be used, such as combining more than one type in a single data structure, splitting a single type into two or more data structures, or any combination thereof.

In an embodiment, the initial identifier type is automatically encoded into the initial identifier generated by the service provider system 106 according to the characteristics of the user account to which the initial identifier is to be associated and/or of the user application 104 to which the initial identifier is being provided. For example, when the user application 104 transmits an authentication request to the service provider system 106, the user application 104 may provide identifying information associated with the user application 104 and/or with the user device 102. For instance, the user application 104 may provide the name of the user application 104, information corresponding to the creator or issuer of the user application 104 (e.g., the service provider, a third-party entity, etc.), the version of the user application 104, and the like. As another example, the user application 104 may additionally, or alternatively, provide information corresponding to the operating system implemented on the user device 102, a network address associated with the user device 102 (e.g., Internet Protocol (IP) address, a Media Access Control (MAC) address, etc.), and the like. Based on this information, the service provider system 106 may assign an initial identifier type for the initial identifier to be provided to the user application 104.

In an embodiment, the service provider system 106 implements a machine learning algorithm or artificial intelligence that is dynamically trained to assign initial identifier types for different initial identifiers that are to be provided to user applications in response to authentication requests. The machine learning algorithm or artificial intelligence may be dynamically trained, in real-time, using unsupervised training techniques. For instance, a dataset of sample characteristics corresponding to different user applications and user devices may be analyzed using a clustering or classification algorithm to classify the sample characteristics according to a set of different classifications (e.g., initial identifier types). For instance, the machine learning algorithm or artificial intelligence may be dynamically trained in real-time by classifying the sample characteristics according to one or more vectors of similarity between the sample characteristics and other clusters of characteristics to different initial identifier types. Thus, in some embodiments, the service provider system 106, through the machine learning algorithm or artificial intelligence, can perform such clustering and obtain partial matches among other clusters of characteristics to identify a particular cluster and, from this cluster, assign a particular initial identifier type for the provided set of user application characteristics and/or user device characteristics indicated in the authentication request. For instance, each cluster maintained by the machine learning algorithm or artificial intelligence may be assigned a unique initial identifier type, which may be assigned to any combination of user application and/or user device characteristics received through an authentication request. Example clustering algorithms that may be trained using this dataset may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like.

It should be noted that the aforementioned machine learning algorithm or artificial intelligence may be dynamically trained, in real-time, to continuously process different user application and user device characteristics provided by myriad user applications in real-time and as these characteristics are received. Further, the aforementioned machine learning algorithm or artificial intelligence may be continuously updated, in real-time, as different characteristics are identified, clustered, and used to generate new initial identifiers. As these different characteristics are received, the service provider system 106 may evaluate these different characteristics to determine whether re-clustering of the sample dataset (including the newly received characteristics) is required.

In an embodiment, based on the initial identifier type assigned to the user application 104 that submitted the authentication request and to which the initial identifier is to be provided, the service provider system 106 generates an initial identifier that automatically encodes the initial identifier type obtained through the machine learning algorithm or artificial intelligence described above into the initial identifier. For example, if the initial identifier includes a string of alphanumeric or other special characters that are used to uniquely, or substantially uniquely, identify a user account from among other user accounts maintained by the service provider system 106, a pre-defined number of alphanumeric or other special characters may be reserved to define the initial identifier type for the initial identifier. The service provider system 106 may automatically assign a unique character string for each of the initial identifier types and accordingly use the unique character string corresponding to the identified initial identifier type for inclusion in the initial identifier. The remaining characters of the initial identifier may be associated with the user account to which the initial identifier is associated.

In some instances, the initial identifier type determined based on an analysis of the user application and/or user device characteristics by the machine learning algorithm or artificial intelligence may correspond to the kind of initial identifier that is to be generated for the particular user account and provided to the user application 104. For instance, a particular cluster may correspond to a version 4 UUID, whereby any set of characteristics that are assigned to this particular cluster may result in the service provider system 106 automatically generating and issuing a version 4 UUID to the corresponding user application 104 for use in subsequent API calls to the API gateway 108. At the same time, a different cluster may correspond to a version 1 UUID, whereby a different user application having a different set of user application and/or user device characteristics may be assigned a version 1 UUID. If the different clusters are organized according to the different initial identifier configurations, the service provider system 106 may automatically determine the initial identifier type according to the configuration of the initial identifier provided in an API call.

In an embodiment, and as illustrated in FIG. 1B, the service provider system 106 implements, through the API gateway 108, an initial identifier generator 120 that is configured to dynamically generate initial identifiers according to the characteristics of the user application 104 and/or user device 102 that is submitting API calls to the service provider system 106. The initial identifier generator 120, in an embodiment, is a special-purpose computing device that includes one or more special-purpose processors (such as the special-purpose processor described herein in FIG. 8) and other special-purpose components that are specifically tailored to perform the aforementioned functionalities related to the automatic processing, in real-time, of user application and/or user device characteristics to dynamically generate initial identifiers according to assigned initial identifier types selected based on these characteristics.

The initial identifier generator 120, in an embodiment, receives an indication from the service provider system 106 that an authentication process for the user application 104 has been completed successfully. In response to this indication, the initial identifier generator 120 may automatically determine a set of characteristics associated with the user application 104 and/or the user device 102 that executes the user application 104 to determine the initial identifier type that is to be used to generate a new initial identifier for the user application 104. These characteristics may be determined based on identifying information provided by the user application 104 during the authentication process, as described above. Based on this identifying information, the initial identifier generator 120 may assign an initial identifier type for the initial identifier.

In an embodiment, the initial identifier generator 120 maintains, according to different characteristic classifications, different initial identifier types that may serve as seeds for generating new initial identifiers for different user applications, such as user application 104. These different characteristic classifications may correspond to different characteristics and/or combinations of characteristics. For instance, a characteristic classification maintained by the initial identifier generator 120 may correspond to a particular third-party associated with a user application known to interact with the service provider system 106 (e.g., a publisher of the user application, an institution or company associated with the user application, a developer of the user application, etc.). As another illustrative example, a characteristic classification maintained by the initial identifier generator 120 may correspond to a combination of an operating system implemented on a user device and the name of the user application.

Each characteristic classification maintained by the initial identifier generator 120 may correspond to a particular initial identifier type. For instance, a first characteristic classification maintained by the initial identifier generator 120 may be associated with a version 4 UUID, whereby the initial identifier generator 120 may automatically generate a version 4 UUID in response to receiving identifying information corresponding to this first characteristic classification. A second characteristic classification, alternatively, may be associated with a version 1 UUID, whereby the initial identifier generator 120 may automatically generate a version 1 UUID in response to receiving identifying information corresponding to this second characteristic classification. Thus, based on the authentication process performed for a user application 104, the initial identifier generator 120 may determine the initial identifier type for the new initial identifier, automatically generate the new initial identifier according to the identified initial identifier type, and issue the initial identifier to the user application 104. Further, the initial identifier generator 120 may update a corresponding identifier translation data structure (as described herein) to associate this new initial identifier with a corresponding primary identifier.

In one or more embodiments, once the API gateway 108 determines the initial account identifier type, and uses the initial account identifier type to identify the appropriate identifier translation data structure of the identifier translation data structure(s) 110, the API gateway 108 uses the identifier translation data structure to perform a translation request. In one or more embodiments, a translation request includes using the initial identifier obtained from the API call received from the user application 104 to obtain the primary identifier associated with the initial identifier from the identifier translation data structure. As an example, the initial identifier may be used as a key to look up, in an in-memory database, a value that is the primary identifier associated with the initial identifier. Said another way, the API gateway 108 obtains the primary identifier from the identifier translation data structure corresponding to the initial identifier type by using the initial identifier to obtain the primary identifier.

In one or more embodiments, the API call and the primary identifier are used to perform an API action requested by the API call. The API action may be performed using service provider resource(s) 112. The service provider resource(s) 112 may be implemented on one or more computing devices of the service provider system 106, or any portion thereof. Alternatively, the service provider resource(s) 112 may be implemented as an application or other executable process on one or more computing devices of the service provider system 106. The service provider resources 112 may include any resources of the service provider system 106 that may be used to service an API call. As an example, the service provider resources 112 may include storage (e.g., storage device 810 of FIG. 8) that includes any number of data structures of any type that store information related to one or more user accounts of the user of the user application 104. The API call may be requesting an API action to retrieve such information, update the information, delete the information, add additional information, etc.

In one or more embodiments, the API gateway 108 performs the API action requested by the API call using the service provider resource(s) 112 to obtain an API call result. As an example, if the API call was a request for information (e.g., a user account summary, rewards feature balance, etc.), the API call result may include the requested information. As another example, if the API call was a request to update information (e.g., update an address associated with the user account), the API call result may include a confirmation that the information was successfully updated. As another example, if the API call was a request that a certain action be performed (e.g., a payment be made towards the balance of a credit account), then the API call result may include a confirmation that the action was performed.

In one or more embodiments, the API call result may also include a field for an account identifier. However, in one or more embodiments, the service provider system is configured to not transmit the primary identifier used to perform the API action outside the service provider system 106. Therefore, in one or more embodiments, the service provider replaces the primary identifier with the initial identifier obtained from the API call in any account identifier field of the API call result.

In one or more embodiments, the API call result, including the initial identifier in any field requiring an account identifier is then transmitted to the user application 104 from the service provider system 106. In one or more embodiments, the user application 104 then, if relevant, provides the API call result, or any portion thereof, to the user (e.g., by displaying the API call result as part of a user interface or page presented to the user on the user device 102). As an example, if account information was requested via the API call, the account information included in the API call result may be presented within the user application 104. As another example, if the API call requested that an action be performed (e.g., make a payment, update information, delete information, etc.), then a confirmation that the requested action was performed may be displayed for the user in the user application 104.

In one or more embodiments, the user application 104 uses the initial identifier (or more than one if the user is accessing more than one account via the user application 104) each time an API call is made to the service provider system 106. In one or more embodiments, the initial identifier remains valid until the user session ends (e.g., due to user logout or inactivity), or the initial identifier expiration time is exceeded, whichever occurs first. In one or more embodiments, if a user session for which an initial identifier was issued to the user application 104 remains active for longer than the expiration time associated with the initial identifier, the service provider system may determine that the initial identifier is expired (as described above). Similarly, in one or more embodiments, if the initial identifier is used a maximum amount of times (as defined by the service provider system 106 when generating and issuing the initial identifier), the service provider system 106 may determine that the initial identifier is expired. In one or more embodiments, when the service provider system 106 determines that the initial identifier is expired, and that the user session for which the initial identifier was issued remains active, the service provider system, dynamically in real-time, generates a new initial identifier (e.g., generates a new UUID) associated with the user account, stores an association between the initial identifier and a primary identifier of the user account in an identifier translation data structure of the identifier translation data structure(s) 110, associates an expiration time or other expiration condition (e.g., maximum number of uses, etc.) with the new initial identifier (as described above), and transmits the new initial identifier to the user application 104. In one or more embodiments, after receiving the new initial identifier, the user application uses the new initial identifier in any account identifier fields of subsequent API calls made for the user account associated with the initial identifier to the service provider system 106.

In one or more embodiments, using an initial identifier instead of a primary identifier for API calls made from remote user applications to a service provider system 106 allows the service provider system 106 to reduce the risk that the primary identifier, which may be deemed to be sensitive information, from being exposed outside the service provider system. Additionally, assigning an expiration time and/or other expiration condition(s) to initial identifiers may reduce the risk that the initial identifier is obtained from the user application and later used (e.g., nefariously) to access a user account maintained by the service provider. Additionally, using the identifier translation technique described herein to translate initial identifiers to primary identifiers used to perform API actions requested by API calls allows the service provider to use a single primary identifier for a given user account to perform API actions regardless of how many user application instances access the user account, or how many different times a user application accesses the account, as each user session is issued a unique initial identifier to make API calls rather than the primary identifier associated with the user account.

Figure 2:
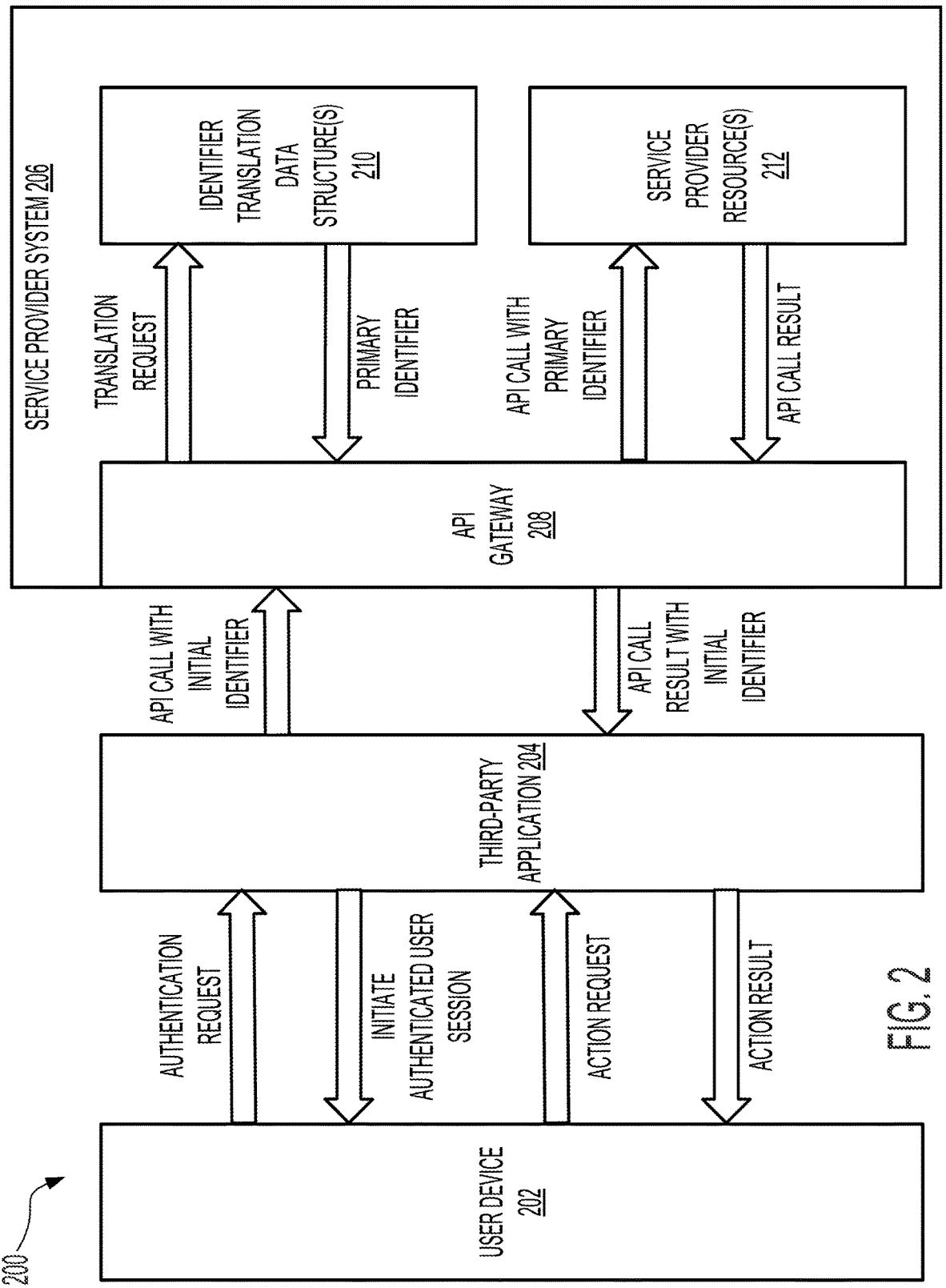
FIG. 2 shows an illustrative example of an environment in which a third-party application interacts with a service provider system 206 in order to make one or more API calls using an initial identifier that is translated by the service provider system into a primary identifier that is used to service the API call in accordance with one or more embodiments described herein.

FIG. 2 shows an illustrative example of an environment 200 in which a user device 202 interacts with third-party application 204 in order to interact with a service provider system 206 in order to make one or more API calls. The user device 202 may be a computing device such as the computing device 802 described herein at least in connection with FIG. 8. The user device 202 may be, for example, a laptop computer, a desktop computer, a smartphone, a tablet, a smart watch, or any other type of computing device such as those described herein. The user device 202 may be a device owned by or otherwise provided to an individual user (not shown). The user device 202 may be a device owned by or otherwise controlled by an entity (e.g., a retailer) that has a relationship with the service provider associated with the service provider system 206. As an example, a retailer may have a physical establishment in which a user device 202 is in communication with the service provider system 206, and may be used to apply for credit, access account information, etc. Accordingly, the user device 202, within this physical establishment (e.g., a point-of-sale location, etc.), may be implemented through a kiosk or through existing point-of-sale devices, such as a checkout terminal.

The service provider system 206 may be one or more computing devices such as the computing device 802 described herein at least in connection with FIG. 8. As an example, the service provider system 206 may be one or more server computing devices controlled or otherwise used by a service provider (not shown). As used herein, a service provider may be any entity that provides services of any type. As an example, a service provider may be a financial institution, retailer, etc. that provides various services (e.g., account access, account summary information, account update capabilities, account details information, upcoming payment deadlines, etc.) to users having one or more accounts with the service provider that are associated with a third-party, such as a retailer.

The third-party application 204 may be an application or other executable process. The third-party application 204 may execute on the user device 202. Alternatively, the third-party application may execute on a device (not shown) separate from the user device 202, and the user device 202 may include a user interface (not shown) through which a user of the user device 202 interacts with the third-party application 204. The third-party application 204 may be a single page application (SPA) (e.g., executing in a browser of the user device 202), a native application executing on the user device 202, a progressive web application (PWA), a multi-page application (MPA), etc. The third-party application 204 may be any other form of an application or program without departing from the scope of embodiments described herein. The third-party application 204 may be provided by a third-party entity that has a relationship with the service provider associated with the service provider system 206. Alternatively, the third-party application 204 may be provided by the service provider associated with the service provider system 206 on behalf of a third-party entity. For example, a retailer may have a relationship with the service provider whereby the service provider provides credit card account services for customers of the retailer. In such a scenario, the third-party application may be branded, at least in part, with branding of the third-party, but be provided by the service provider.

In one or more embodiments, prior to interaction with the service provider system 206 via the third-party application 204, a user of the user device 202 requests an account from the third-party associated with the third-party application 204. Such a request may include an account set-up (i.e., creation) process by which the user establishes the user account with the third-party. In one or more embodiments, to establish the user account, the third-party may obtain information from the user, and provide the information to the service provider system 206 in order to establish the user account on the service provider system 206. In one or more embodiments, the third-party, the service provider, or a combination thereof assigns a third-party account number to be associated with the user account to be maintained by the service provider system 206. In one or more embodiments, the service provider also assigns a primary identifier to the user account. In one or more embodiments, the third-party account number is to be used as an initial identifier when the third-party application makes API calls to the service provider system 206, and the service provider system 206 translates the initial identifier into the primary identifier to service the API call.

The initial identifier assigned to the user account during the account creation process may be any information item that uniquely, or substantially uniquely, identifies a user account from among user accounts maintained by the service provider system 206 for the third-party associated with the third-party application 204. As an example, the initial identifier may be a string of alphanumeric or other special characters (e.g., "-"). In one or more embodiments, the initial identifier is a universally unique identifier (UUID), which may also be referred to as a globally unique identifier (GUID). A UUID may be generated using any suitable technique for generating a unique identifier (see, e.g., the description of FIGS. 1A-1B, above). In one or more embodiments, the initial identifier uniquely identifies a user account from among the user accounts associated with the third-party and maintained by the service provider system 206.

In one or more embodiments, the service provider system 206 includes identifier translation data structure(s) 210. In one or more embodiments, the identifier translation data structure(s) 210 are one or more data structures of any type that store initial identifiers (e.g., third-party account numbers) associated with primary identifiers. In one or more embodiments, as discussed above, internal to the service provider system 206, a given user account is associated with a primary identifier (e.g., a primary account number). In one or more embodiments, an initial identifier associated with a given user account is thus associated with the primary identifier for that account in the identifier translation data structure(s) 210. The identifier translation data structure(s) 210 may be stored in any form of storage, such as, for example, storage device 810 shown in FIG. 8 and described below. In one or more embodiments, when user account is created on the service provider system 206, the service provider associates the initial identifier (e.g., the third-party account number) with the primary identifier for the same account, and stores the association in the identifier translation data structure(s) 210.

As discussed above, the service provider system 206 may expose any number of APIs to any number of third-party applications (e.g., third-party application 204), which may make API calls to request API actions performed using service provider resources 212. The service provider resource(s) 212 may be implemented on one or more computing devices of the service provider system 206, or any portion thereof. Alternatively, the service provider resource(s) 212 may be implemented as an application or other executable process on one or more computing devices of the service provider system 206. The service provider resources 212 may include any resources of the service provider system 206 that may be used to service an API call. As an example, the service provider resources 212 may include storage (e.g., storage device 810 of FIG. 8) that includes any number of data structures of any type that store information related to one or more user accounts of the user of the third-party application 204. The API call may be requesting an API action to retrieve such information, update the information, delete the information, add additional information, etc.

In one or more embodiments, the service provider system 206 includes an API gateway 208. The API gateway 208 may be implemented on one or more computing devices of the service provider system 206, or any portion thereof. Alternatively, the API gateway 208 may be implemented as an application or other executable process on one or more computing devices of the service provider system 206. In one or more embodiments, the API gateway 208 exposes one or more APIs of the service provider system 206 to third-party applications, so that the third-party applications may, via the API gateway 208, request the service provider to perform various actions, functionality, etc. In one or more embodiments, the API gateway 208 is configured to service API calls received from third-party applications, such as, for example, third-party application 204. In one or more embodiments, an API call is a request made by the third-party application 204 to the API gateway 208 of the service provider system 206 to perform one or more API actions, such as retrieving information, updating information, deleting information, adding information, performing various operations, methods, functions, etc.

In one or more embodiments, prior to the third-party application 204 making API calls to the API gateway 208, an authenticated third-party application session is initiated. In one or more embodiments, to initiate an authenticated third-party application session, the third-party application 204 transmits an authentication request to the service provider system 206. In one or more embodiments, an authentication request includes any information which may be subjected to a verification process by the service provider system 206 in order to authenticate the user (not shown) of the third-party application. An authentication request may include an identifier associated with a user (e.g., username, email address, etc.) and one or more other information items that allow the service provider system 206 to verify the identity of the user. As an example, the service provider system 206 may employ single factor authentication and require a username and password. As another example, the authentication request may include biometric information (e.g., facial scan, fingerprint, iris scan, etc.) of the user. An authentication request may include any number of discrete steps without departing from the scope of embodiments described herein. As an example, a user, via the third-party application, may provide a username and password as part of the authentication request to the service provider system 206. However, the service provider system 206 may additionally check whether the user device 202 on which the third-party application 204 executes is recognized by the service provider system 206 (e.g., the user has previously been authenticated when using the third-party application on the user device 202). When the user device 202 is not recognized, the service provider system 206 may require additional information to authenticate the user (e.g., multifactor authentication), such as providing a unique code provided to a separate device associated with the user (e.g., a user mobile device (not shown)). In one or more embodiments, the authentication is performed by the service provider system using API calls to an authentication service API (not shown) of the service provider system 106. Although the foregoing description of the authentication process describes the authentication being performed by the service provider system 206, in some embodiments, all or any portion of the authentication process may be performed by a third-party system (not shown) in order to initiate an authenticated user session of the third-party application 204 for a user.

In one or more embodiments, in addition to assigning or obtaining from a third-party during an account creation process an initial identifier, and, dynamically in real-time, storing the association between the initial identifier and a primary identifier for a given user account in the identifier translation data structure(s) 210, the service provider system 206 may also perform any number of other steps as part of the authentication process. As an example, after authentication, the service provider system 206 may issue an access token to the third-party application 204. As another example, the service provider system 206 and the third-party application 204 may exchange encryption keys for encrypting information transmitted between the third-party application 204 and the service provider system 206. Other actions may be included in the authentication process prior to the third-party application 204 being able to make API calls to the service provider system 206 without departing from the scope of embodiments described herein.

In one or more embodiments, once an authenticated user session has been initiated, the third-party application 204 may be ready to make API calls to the service provider system 206. In one or more embodiments, the third-party application 204 is configured to interact, at least in part, with the service provider system 206 via one or more APIs exposed by the service provider system 206 via the API gateway 208. To interact with the one or more APIs of the service provider system 206, the third-party application 204 may make API calls to the API gateway 208 of the service provider system 206. In one or more embodiments, an API call is a request made to an API for one or more actions to be performed. Such actions may include, but are not limited to, obtaining information (e.g., accessing account information for one or more accounts), updating information, deleting information, executing a method, process, function, etc. As an example, the service provider may be an entity that provides any number of user accounts for credit cards, bank accounts, etc., and API calls may be made by user application 104 to the service provider system 106 to perform actions such as accessing account information, updating account information, viewing account summaries and account details, viewing payment history, viewing account balances, making payments, filing disputes, etc.

In one or more embodiments, an API call may include one or more fields or portions in which information is to be provided. One such field or portion is an account identifier field. In one or more embodiments, an account identifier field includes an account identifier that allows the service provider system receiving the API call to identify the account that the API call is being used to access by the user application. However, the account identifier identifying a user account with the service provider system may be deemed as sensitive information. For example, an account identifier may be information subject to the PCI DSS. Being sensitive information, in one or more embodiments, the service provider system assigns primary account identifiers to user accounts, as discussed above. In order to mitigate the risk that the primary identifier of a user account is exposed, the service provider does not provide the primary identifier to the third-party application 204. In one or more embodiments, the third-party application 204 uses the initial identifier (i.e., the third-party account number assigned to the user account during account creation) in the account identifier field of API calls when making API calls to the service provider system 206 to access user accounts.

In one or more embodiments, as discussed above, the third-party application 204 interacts, at least in part, with the service provider system 206 by making API calls to the API gateway 208 of the service provider system 206. In one or more embodiments, to make an API call, the third-party application 204 first assesses the API call to determine if any fields or portions of the API call are designated as requiring that the third-party application provide an account identifier. In one or more embodiments, when one or more such fields or portions of an API call are identified, the third-party application 204 obtains the initial identifier, and transmits the API call with the initial identifier in the relevant one or more fields, as the third-party application does not have the primary identifier associated with the user account for which the API call is being made.

In one or more embodiments, when the API gateway 208 receives the API call from the third-party application 204, the API gateway 208 may first validate that the third-party application 204 is allowed to make the API call. For example, the API gateway 208 may first validate that an access token included with the API call by the third-party application 204 access token is valid (e.g., it has not expired), and that the access token indicates that the third-party application has appropriate permissions to make the API call. In one or more embodiments, if the third-party application is not allowed to make the API call (e.g., if the access token is not valid and/or the access token indicates that the third-party application 204 is not allowed to make the API call), the API gateway 208 does not service the API call. In such a scenario, the API gateway 208 may transmit a denial to the third-party application 204 indicating that the API call cannot be made, and may also include information relating to the reason(s) for the denial (e.g., access token is expired). In one or more embodiments, when the API gateway 208 determines that the third-party application 204 is allowed to make the API call (e.g., that the access token is valid and that the third-party application 204 has permission to make the API call), the API gateway 208 determines whether the API call includes an account identifier field. In one or more embodiments, when the API call includes an account identifier field, the service provider system 206 obtains the initial identifier from the account identifier field of the API call.

In one or more embodiments, the API gateway 208 assesses the initial identifier to determine an initial identifier type. In one or more embodiments, an initial identifier may be issued by the service provider system 206 to a user application (e.g., user application 104 of FIGS. 1A-1B) after an authentication process, as discussed above in the description of FIGS. 1A-1B. However, there may be any number of different types of initial identifiers, and each type may be associated with a separate identifier translation data structure of the identifier translation data structure(s) 210. Additionally, or alternatively, a user may have a user account with the service provider system 206 that is accessed through the third-party application 204 for an account that is associated with the third party, and such an account may have an initial identifier (e.g., a third-party account number) provided by the third-party and/or the service provider system 206 during an account creation process with the service provider system 206, as described above. There may be any number of such third parties, and each may be associated with a separate identifier translation data structure of the identifier translation data structure(s) 210. Thus, identifying the type of an initial identifier may include determining that the initial identifier is associated with a particular third-party. In one or more embodiments, identifying the type of initial identifier allows the service provider system to discern the appropriate identifier translation data structure of the identifier translation data structure(s) 210 to use for identifier translation. Although the above description contemplates separate identifier translation data structures for each type of initial identifier, one having skill in the art, and the benefit of this Detailed Description, will appreciate that any other division of the identifier translation data structure(s) 210 may be used, such as combining more than one type in a single data structure, splitting a single type into two or more data structures, or any combination thereof.

In an embodiment, the initial identifier type is automatically encoded into the initial identifier generated by the service provider system 206 according to the third-party application 204 or corresponding third-party that publishes or otherwise provides the third-party application 204. For example, when the third-party application 204 transmits an authentication request to the service provider system 206, the third-party application 204 may provide identifying information associated with the third-party application 204 and/or with the third-party that provides the third-party application 204. For instance, the third-party application 204 may provide the name of the third-party application 204, information corresponding to the creator or issuer of the third-party application 204 (e.g., a third-party, etc.), the version of the third-party application 204, and the like. Based on this information, the service provider system 206 may generate and assign an initial identifier type for the initial identifier to be provided to the third-party application 204.

In an embodiment, the service provider system 206 can automatically designate a particular initial identifier type according to the third-party application 204 and/or third-party that provided the third-party application 204 to which an initial identifier is to be provided. For example, if the initial identifier includes a string of alphanumeric or other special characters that are used to uniquely, or substantially uniquely, identify a user account from among other user accounts maintained by the service provider system 206, a pre-defined number of alphanumeric or other special characters may be reserved to define the initial identifier type for the initial identifier. The service provider system 206 may automatically assign a unique character string for each of the initial identifier types and accordingly use the unique character string corresponding to the identified initial identifier type for inclusion in the initial identifier. The remaining characters of the initial identifier may be associated with the user account to which the initial identifier is associated.

In some instances, the service provider system 206 may designate a particular initial identifier configuration according to each of the different third-party applications and/or corresponding third-parties that interact with the service provider system 206. For example, for a particular third-party application 204, the service provider system 206 may generate version 4 UUIDs having a pre-defined set of characteristics (e.g., one or more characters having fixed values that may be uniquely associated with the particular third-party application 204, etc.). However, for a different third-party application, the service provider system 206 may alternatively generate version 1 UUIDs. Thus, according to the third-party application and/or third-party associated with the authentication request, the service provider system 206 may determine the configuration of the initial identifier that is to be provided to the third-party application. This configuration of the initial identifier, thus, may serve as the initial identifier type usable to identify the corresponding identifier translation data structure.

In one or more embodiments, once the API gateway 208 determines the initial account identifier type and uses the initial account identifier type to identify the appropriate identifier translation data structure of the identifier translation data structure(s) 210, the API gateway 208 uses the identifier translation data structure to perform a translation request. In one or more embodiments, a translation request includes using the initial identifier obtained from the API call received from the third-party application 204 to obtain the primary identifier associated with the initial identifier from the identifier translation data structure. As an example, the initial identifier may be used as a key to look up, in an in-memory database, a value that is the primary identifier associated with the initial identifier. Said another way, the API gateway 208 obtains the primary identifier from the identifier translation data structure corresponding to the initial identifier type by using the initial identifier to obtain the primary identifier.

In one or more embodiments, the API call and the primary identifier are used to perform an API action requested by the API call. The API action may be performed using service provider resource(s) 212. The API call may be requesting an API action to retrieve such information, update the information, delete the information, add additional information, etc. In one or more embodiments, the API gateway 208 performs the API action requested by the API call using the service provider resource(s) 212 to obtain an API call result.

As an example, if the API call was a request for information (e.g., a user account summary, rewards feature balance, etc.), the API call result may include the requested information. As another example, if the API call was a request to update information (e.g., update an address associated with the user account), the API call result may include a confirmation that the information was successfully updated. As another example, if the API call was a request that a certain action be performed (e.g., a payment be made towards the balance of a credit account), then the API call result may include a confirmation that the action was performed.

In one or more embodiments, the API call result may also include a field for an account identifier. However, in one or more embodiments, the service provider system is configured to not transmit the primary identifier used to perform the API action outside the service provider system 106. Therefore, in one or more embodiments, the service provider replaces the primary identifier with the initial identifier (i.e., the third-party account number assigned to the user account at the time of account creation) obtained from the API call in any account identifier field of the API call result.

In one or more embodiments, the API call result, including the initial identifier in any field requiring an account identifier is then transmitted to the third-party application 204 from the service provider system 206. In one or more embodiments, the third-party application 204 then, if relevant, provides the API call result, or any portion thereof, to the user (e.g., by displaying the API call result as part of a user interface or page presented to the user on the user device 202). As an example, if account information was requested via the API call, the account information included in the API call result may be presented within the third-party application 204. As another example, if the API call requested that an action be performed (e.g., make a payment, update information, delete information, etc.), then a confirmation that the requested action was performed may be displayed for the user in the third-party application 204.

In one or more embodiments, using an initial identifier instead of a primary identifier for API calls made from remote user applications to a service provider system allows the service provider system to reduce the risk that the primary identifier, which may be deemed to be sensitive information, from being exposed outside the service provider system. Additionally, using the identifier translation technique described herein to translate initial identifiers to primary identifiers used to perform API actions requested by API calls allows the service provider to use a single primary identifier for a given user account to perform API actions regardless of how many third-party application instances access the user account, or how many different times a third-party application accesses the account, as the third-party application uses the initial identifier to make API calls rather than the primary identifier associated with the user account.

Figure 3:
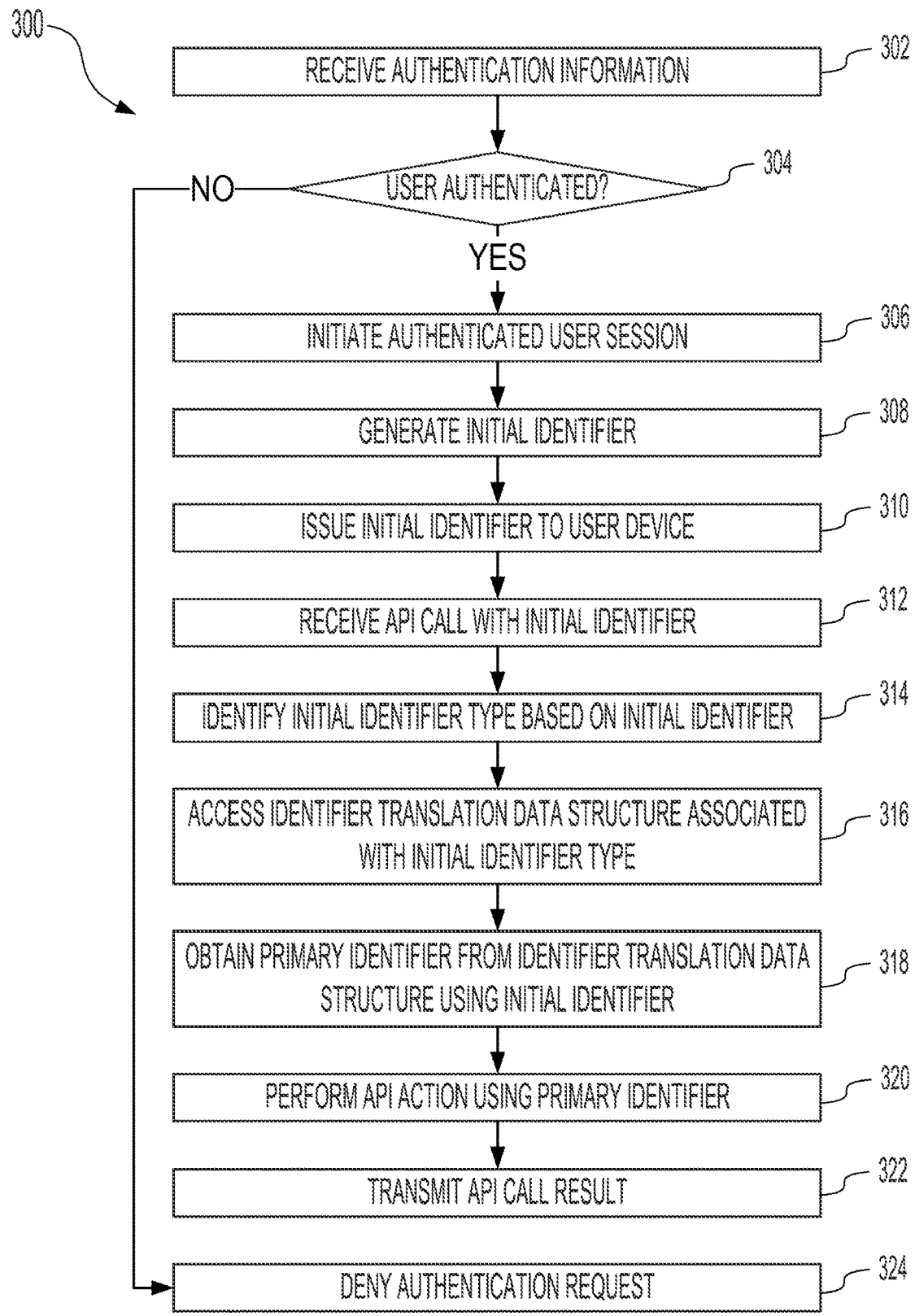
FIG. 3 shows an illustrative example of a process for generating and issuing an initial identifier to a user application provided by a service provider for use when the user application makes API calls to a service provider system associated with the service provider in accordance with one or more embodiments described herein.

FIG. 3 shows an illustrative example of a process 300 for generating and issuing an initial identifier to a user application provided by a service provider for use when the user application makes API calls to a service provider system associated with the service provider in accordance with one or more embodiments described herein. The process 300 may be performed, for example, by a service provider system, such as service provider system 106 described above at least in conjunction with FIGS. 1A-1B.

At step 302, an authentication request is received at a service provider system from a user device. In one or more embodiments, an authentication request includes any information which may be subjected to a verification process by the service provider system in order to authenticate the user of the user application from which the authentication request is received. An authentication request may include an identifier associated with a user (e.g., username, email address, etc.) and one or more other information items that allow the service provider system to verify the identity of the user (i.e., authenticate the user). As an example, the service provider system may employ single factor authentication and require a username and password. As another example, the authentication request may include biometric information (e.g., facial scan, fingerprint, iris scan, etc.) of the user. An authentication request may include any number of discrete steps without departing from the scope of embodiments described herein. As an example, a user, via the user application, may provide a username and password as part of the authentication request to the service provider system. However, the service provider system may additionally check whether the user device on which the user application executes is recognized by the service provider system (e.g., the user has previously been authenticated when using the user application on the user device). When the user device is not recognized, the service provider system may require additional information to authenticate the user (e.g., multi-factor authentication), such as providing a unique code provided to a separate device associated with the user (e.g., a user mobile device (not shown)).

At step 304, a determination is made as to whether the user associated with the authentication request received in Step 302 is authenticated. In one or more embodiments, the authentication is performed by an API gateway (e.g., the API gateway 108 shown in FIGS. 1A-1B and described above) of the service provider system using one or more API calls to an authentication sub-system of the service provider system. In one or more embodiments, the authentication sub-system includes and/or has access to one or more data structures that may be used to authenticate a user in response to an authentication request. As an example, an authentication request may include a username and passcode. The authentication sub-system may include a data structure that includes usernames associated with a hash of a passcode corresponding to the username. The API gateway may make an API call to the authentication sub-system that includes the username and passcode, and the authentication sub-system performs a hash of the passcode. The result may then be compared with the hash in the data structure to determine if there is a match, which, if so, indicates the passcode is correct. Similar series of events may occur using information other than passcodes without departing from the scope of embodiments described herein. As an example, a different form of information may be provided as part of the authentication request API call from the API gateway to the authentication sub-system, such as biometric information (e.g., face scan information, fingerprint information, iris scan information, etc.), or information gained from a card swiped on or inserted into the user device by a user.

In one or more embodiments, the authentication of a user may require that additional steps be performed in response to an authentication request. As an example, the user may be required to perform multi-factor authentication, which may, for example, require that the user access a separate application on a separate mobile device of the user to interact with an interactive element within the application to further verify the identity of the user. As another example, the service provider system may be configured to determine whether the user device from which the authentication request originated is a recognized device associated with the user. If the user device is not recognized, the user may be asked for a communication channel (e.g. email, text message) to which the service provider system may transmit a one-time code, which the user must obtain and enter in order to become authenticated. The authentication techniques described herein, and any other authentication techniques, may be used in any combination in order to authenticate a user of a user application. As an example, multi-factor authentication (e.g., password, then biometric information, then answering a pre-determined security question (e.g., "What street did you grow up on?")) and further verification of an unrecognized user device may be required for determining if a user is authenticated.

In one or more embodiments, if the user cannot be authenticated, the process proceeds to step 324. In step 324, the authentication request is denied, and the denial is transmitted to the user device from which the authentication request was received. The denial may be accompanied by an invitation to the user to retry the authentication request. As an example, if the passcode could not be verified, the denial of the authentication request may include an indication that the passcode was incorrect, and invite the user to provide the correct passcode. In one or more embodiments, when the user is successfully authenticated, the process proceeds to step 306.

At step 306, based on the successful authentication of the user in step 304, an authenticated user session is initiated. In one or more embodiments, the authenticated user session is initiated by transmitting an indication of successful authentication to the user application from which the authentication request was received in step 302. In one or more embodiments, initiating an authenticated user session may also include other steps, such as receiving a request from the user application for an access token. For example, the indication of successful authentication may be provided to the user application along with a code, and the user application may use the code to request an access token.

At step 308, an initial identifier is generated, dynamically in real-time. In one or more embodiments, the initial identifier is generated by the service provider system. In one or more embodiments, an initial identifier is an identifier that the user application will use in an account identifier field of API calls when making such calls to access a user account of an authenticated user, thereby avoiding the need to use the primary identifier associated with a given account, which is not shared outside the service provider system. A given user may have more than one account with the service provider system, which the user accesses via the user application. In such scenarios, the user may be issued a separate initial identifier for each account, to be used separately in API calls, depending on which account the user application attempts to access via an API call made by the user application to the service provider system.

The one or more initial identifiers may each be any information item that uniquely, or substantially uniquely, identifies a user account from among user accounts maintained by the service provider system 106. As an example, the initial identifier may be a string of alphanumeric or other special characters (e.g., "-"). In one or more embodiments, the initial identifier is a universally unique identifier (UUID), which may also be referred to as a globally unique identifier (GUID). A UUID may be generated using any suitable technique for generating a unique identifier. A UUID may not be mathematically guaranteed to be unique, but may have a probability of being not unique that is low enough to be considered unique within the context of accounts maintained by the service provider system. As an example, the UUID generated by the service provider system may be a version 4 UUID, which includes thirty-two hexadecimal characters representing 128 bits. In one or more embodiments, the bits that comprise the version 4 UUID are randomly generated. Therefore, there are $2^{128}$ possible combinations of bits, leaving the probability that two such generated UUIDs are the same very low within reasonable time and computation power constraints. A UUID used as the initial identifier may be generated using other techniques for UUID generation. For example, a version 1 UUID is generated based on a Media Access Control (MAC) address of a computing device (or component therein) in combination with an exact time of generation, which would not be duplicated unless the two UUIDs were generated using the same device, having the same MAC address, at the same time. Any other technique for generating a UUID may be used without departing from the scope of embodiments described herein.

As noted above, in an embodiment, the service provider system implements a machine learning algorithm or artificial intelligence that is dynamically trained to assign initial identifier types for different initial identifiers that are to be provided to user applications in response to authentication requests. The machine learning algorithm or artificial intelligence may be dynamically trained, in real-time, using unsupervised training techniques. For instance, a dataset of sample characteristics corresponding to different user applications and user devices may be analyzed using a clustering or classification algorithm to classify the sample characteristics according to a set of different classifications (e.g., initial identifier types). For instance, the machine learning algorithm or artificial intelligence may be dynamically trained in real-time by classifying the sample characteristics according to one or more vectors of similarity between the sample characteristics and other clusters of characteristics to different initial identifier types. Thus, in some embodiments, the service provider system, through the machine learning algorithm or artificial intelligence, can perform such clustering and obtain partial matches among other clusters of characteristics to identify a particular cluster and, from this cluster, assign a particular initial identifier type for the provided set of user application characteristics and/or user device characteristics indicated in the authentication request. For instance, each cluster maintained by the machine learning algorithm or artificial intelligence may be assigned a unique initial identifier type, which may be assigned to any combination of user application and/or user device characteristics received through an authentication request.

Based on the initial identifier type assigned to the user application that submitted the authentication request and to which the initial identifier is to be provided, the service provider system may generate an initial identifier that automatically encodes the initial identifier type obtained through the machine learning algorithm or artificial intelligence described above into the initial identifier. For example, if the initial identifier includes a string of alphanumeric or other special characters that are used to uniquely, or substantially uniquely, identify a user account from among other user accounts maintained by the service provider system, a pre-defined number of alphanumeric or other special characters may be reserved to define the initial identifier type for the initial identifier. The service provider system may automatically assign a unique character string for each of the initial identifier types and accordingly use the unique character string corresponding to the identified initial identifier type for inclusion in the initial identifier. The remaining characters of the initial identifier may be associated with the user account to which the initial identifier is associated.

In some instances, the initial identifier type may correspond to the kind of initial identifier that is to be generated for the particular user account and provided to the user application. For instance, a particular cluster may correspond to a version 4 UUID, whereby any set of characteristics that are assigned to this particular cluster may result in the service provider system automatically generating and issuing a version 4 UUID to the corresponding user application for use in subsequent API calls to the API gateway. At the same time, a different cluster may correspond to a version 1 UUID, whereby a different user application having a different set of user application and/or user device characteristics may be assigned a version 1 UUID. If the different clusters are organized according to the different initial identifier configurations, the service provider system may automatically determine the initial identifier type according to the configuration of the initial identifier provided in an API call.

In one or more embodiments, the initial identifier is associated with an expiration time and/or other expiration conditions. In one or more embodiments, an expiration time for an initial identifier is an amount of time that the initial identifier may be used in API calls to access the account with which the initial identifier is associated. In some instances, the service provider system may define a maximum number of times that an initial identifier may be used before the initial identifier is automatically expired. As another illustrative example, the initial identifier may be single use, whereby the initial identifier is automatically expired once it has been included in an API call to the service provider system and used to identify a corresponding primary identifier.

In one or more embodiments, after generating the initial identifier, the service provider system may implement a technique for verifying whether the initial identifier has expired or otherwise becomes invalid for use by the user application when making an API call. As an example, the service provider system may initiate a timer associated with the initial identifier, and when the timer expires (e.g., after 1800 seconds), the service provider system no longer services API calls that use the initial identifier. As another example, the service provider system may record and store the time at which the initial identifier is generated and, each time an API call is received that includes the initial identifier, uses the generation time and the current time to determine if the expiration time for the initial identifier has been exceeded. As yet another example, the service provider system may record the number of times that an initial identifier has been used in an API call and may determine whether this number corresponds to the maximum number of uses for the initial identifier. If the number corresponding to this maximum number, the service provider system may automatically expire the initial identifier. As another example, if a user of the user application logs out of the application, or is logged out due to inactivity, the initial identifier may be considered invalid, and the service provider system will no longer service API calls made using the initial identifier. In one or more embodiments, in scenarios where one or more initial identifiers associated with a user session of the user application expire, but that the user session remains active, the service provider system may generate one or more new initial identifiers, and transmit the one or more new initial identifiers to the user application (see, e.g., the description of FIG. 4, below).

At step 310, the initial identifier generated in step 308 is transmitted to the user application from which the authentication request was received in step 302. In one or more embodiments, the initial identifier is stored by the user application (e.g., as part of the user application state) to be used when the user application interacts with the service provider system (e.g., when making API calls).

At step 312, an API call is received from a user application at a service provider system. In one or more embodiments, an API call is a request made to an API for one or more actions to be performed. Such actions may include, but are not limited to, obtaining information (e.g., accessing account information for one or more accounts), updating information, deleting information, executing a method, process, function, etc. As an example, the service provider may be an entity that provides any number of user accounts for credit cards, bank accounts, etc., and API calls may be made by the user application to the service provider system to perform actions such as accessing account information, updating account information, viewing account summaries and account details, viewing payment history, viewing account balances, making payments, filing disputes, etc. In one or more embodiments, the API call includes an account identifier field that includes the initial identifier.

At step 314, the initial identifier included in the API call received in step 312 is used to determine an initial identifier type. In one or more embodiments, the API gateway of the service provider system assesses the initial identifier to determine the initial identifier type. In one or more embodiments, the initial identifier type is an initial identifier issued to the user application by the service provider, as discussed above in the description of step 310. The initial identifier type may be identified based on the form and/or content of the initial identifier. For instance, if the initial identifier encodes the initial identifier type through one or more unique alphanumeric characters or other type of characters, the API gateway may automatically evaluate these one or more unique alphanumeric characters or other type of characters to determine the initial identifier type. As another illustrative example, if the service provider system provides different initial identifier configurations according to one or more characteristics of the user application and/or user device authenticated in response to the authentication request, the API gateway may evaluate the initial identifier to determine the configuration of the initial identifier and, accordingly, the initial identifier type. Additionally or alternatively, the initial identifier type may be identified based on having been received as part of an API call from a user application provided by the service provider system.

At step 316, based on the initial identifier type determined in step 314, an identifier translation data structure associated with the initial identifier type is accessed. In one or more embodiments, there may be any number of different types of initial identifiers, and each type may be associated with a separate identifier translation data structure.

At step 318, a primary identifier is obtained from the identifier translation data structure accessed in step 316. In one or more embodiments, the API gateway of the service provider system uses the identifier translation data structure to perform a translation request to obtain the primary identifier. In one or more embodiments, a translation request includes using the initial identifier obtained from the API call received from the user application to obtain the primary identifier associated with the initial identifier from the identifier translation data structure. As an example, the initial identifier may be used as a key to look up, in an in-memory database, a value that is the primary identifier associated with the initial identifier. Said another way, the API gateway obtains the primary identifier from the identifier translation data structure corresponding to the initial identifier type by using the initial identifier to obtain the primary identifier.

At step 320, an API action is performed based on the API call and using the primary identifier obtained in step 318. The API action may be performed using service provider resource(s). The API call may be requesting an API action to retrieve information, update information, delete information, add additional information, etc. In one or more embodiments, the API gateway of the service provider system performs the API action requested by the API call using the service provider resource(s) to obtain an API call result. As an example, if the API call was a request for information (e.g., a user account summary, rewards feature balance, etc.), the API call result may include the requested information. As another example, if the API call was a request to update information (e.g., update an address associated with the user account), the API call result may include a confirmation that the information was successfully updated. As another example, if the API call was a request that a certain action be performed (e.g., a payment be made towards the balance of a credit account), then the API call result may include a confirmation that the action was performed. In one or more embodiments, the API call result may also include a field for an account identifier. However, in one or more embodiments, the service provider system is configured to not transmit the primary identifier used to perform the API action outside the service provider system. Therefore, in one or more embodiments, the service provider replaces the primary identifier with the initial identifier obtained from the API call in any account identifier field of the API call result.

At step 322, the API call result, including the initial identifier in any field requiring an account identifier is then transmitted to the user application from the service provider system. In one or more embodiments, the user application then, if relevant, provides the API call result, or any portion thereof, to the user (e.g., by displaying the API call result as part of a user interface or page presented to the user on the user device). As an example, if account information was requested via the API call, the account information included in the API call result may be presented within the user application. As another example, if the API call requested that an action be performed (e.g., make a payment, update information, delete information, etc.), then a confirmation that the requested action was performed may be displayed for the user in the user application.

Figure 4:
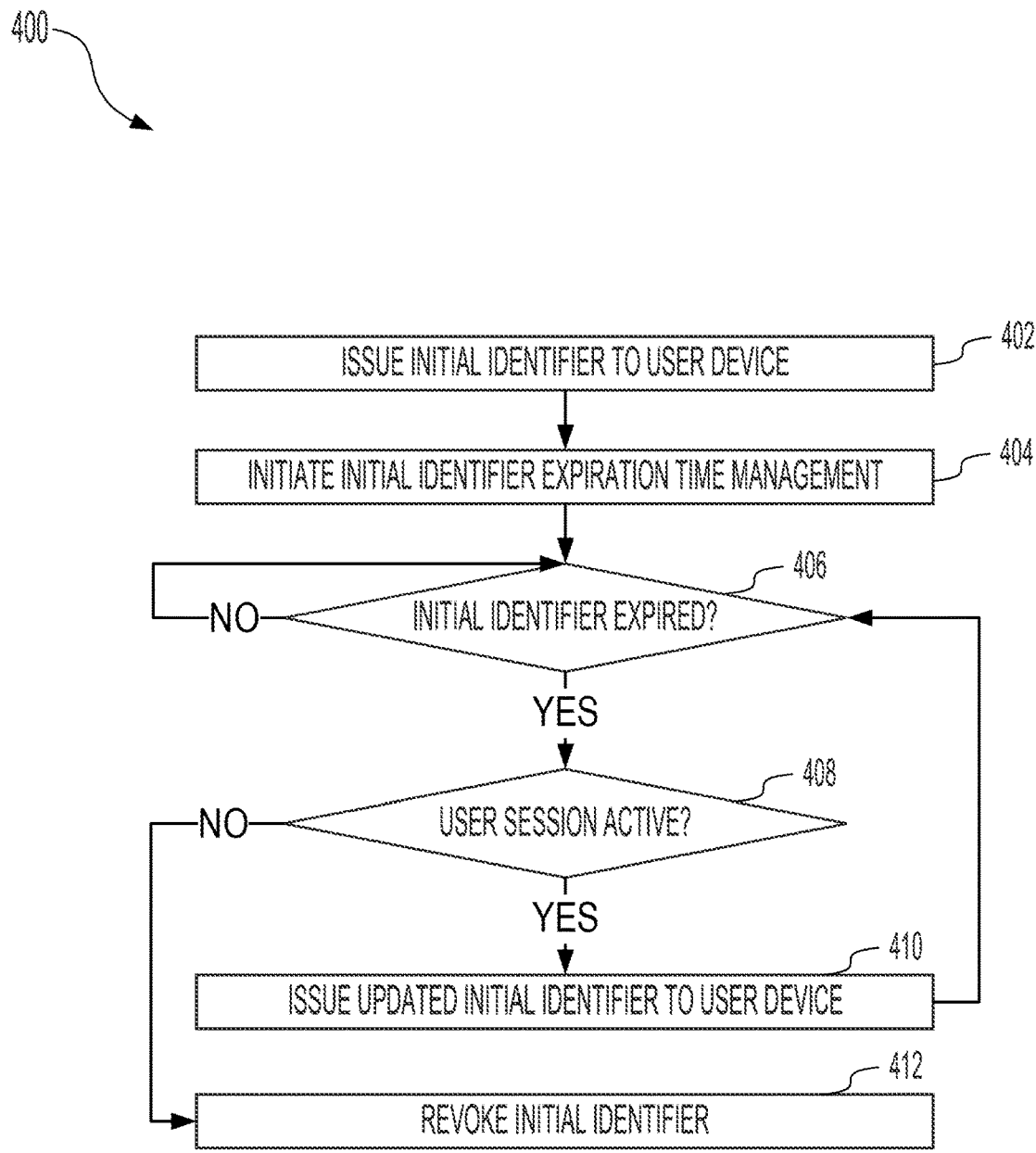
FIG. 4 shows an illustrative example of a process for managing initial identifiers issued to user applications that have an associated expiration time in accordance with one or more embodiments described herein.

FIG. 4 shows an illustrative example of a process 400 for managing initial identifiers issued to user applications that have an associated expiration time in accordance with one or more embodiments described herein. The process 400 may be performed, for example, by a service provider system, such as service provider system 106 described above at least in conjunction with FIGS. 1A-1B.

At step 402, an initial identifier is issued to a user application. In one or more embodiments, the initial identifier is generated by the service provider system and transmitted to the user application, as described in step 308 and step 310 of FIG. 3, and described above.

At step 404, management of an expiration time associated with the initial identifier is initiated. In one or more embodiments, management of the expiration time associated with an initial identifier is performed by the service provider system. In one or more embodiments, an expiration time for an initial identifier is an amount of time that the initial identifier may be used in API calls to access the account with which the initial identifier is associated. In one or more embodiments, after generating the initial identifier, the service provider system may implement a technique for verifying whether the initial identifier has expired or otherwise becomes invalid for use by the user application when making an API call. As an example, the service provider system may initiate a timer associated with the initial identifier, and when the timer expires (e.g., after 1800 seconds), the service provider system no longer services API calls that use the initial identifier. As another example, the service provider system may record and store the time at which the initial identifier is generated and, each time an API call is received that includes the initial identifier, uses the generation time and the current time to determine if the expiration time for the initial identifier has been exceeded. As another example, if a user of the user application logs out of the application, or is logged out due to inactivity, the initial identifier may be considered invalid, and the service provider system will no longer service API calls made using the initial identifier, which may be managed by the service provider system.

At step 406, a determination is made as to whether the initial identifier issued to a user application in step 402 is expired or otherwise invalid. In one or more embodiments, if the initial identifier expiration time management technique initiated in step 404 was a timer, determining whether the initial identifier has expired includes assessing the timer to determine if the expiration time associated with the initial identifier has been exceeded based on the value of the timer. Alternatively, the timer may be configured with the expiration time associated with the initial identifier, and also configured to provide an indication to the service provider system when the timer reaches the expiration time. In one or more embodiments, if the initial identifier expiration time management technique initiated in step 404 was recording the time at which the initial identifier was issued, determining whether the difference between the current time and the time at which the initial identifier was issued exceeds the expiration time associated with the initial identifier. In one or more embodiments, if the expiration time associated with the initial identifier has not been exceeded, the process remains at step 406, and the service provider system continues to check whether the expiration time has been exceeded. In one or more embodiments, if a determination is made that the initial identifier is expired, the process proceeds to step 408.

At step 408, a determination is made as to whether the user session of the user application to which the initial identifier was issued remains active. A user session may become inactive based on any of a variety of reasons. As an example, the user may log out of the user application, thereby ending the user session. As another example, the user may close the user application, which may trigger an end to the user session. As another example, the user may not interact with the user application for a pre-determined period of time (e.g., five minutes), which may cause the user application to close the user session. In one or more embodiments, if the user session is no longer active, the process proceeds to step 412. In one or more embodiments, if the user session remains active, the process proceeds to step 410.

At step 410, based on the determination that the initial identifier is expired, and that the user session remains active, the service provider system discards the expired initial identifier, generates, dynamically in real-time, an updated initial identifier, transmits the updated initial identifier to the user application, and stores an association between the updated initial identifier and a primary identifier in an identifier translation data structure. In one or more embodiments, the user application discards the previous initial identifier, and uses the updated initial identifier when making further API calls to the service provider system.

At step 412, based on a determination that the user session for which the initial identifier was issued is no longer active, the service provider system revokes or otherwise discards the initial identifier. In one or more embodiments, discarding the initial identifier includes removing the association between the initial identifier and a primary identifier associated with the user account from the identifier translation data structure.

Figure 5:
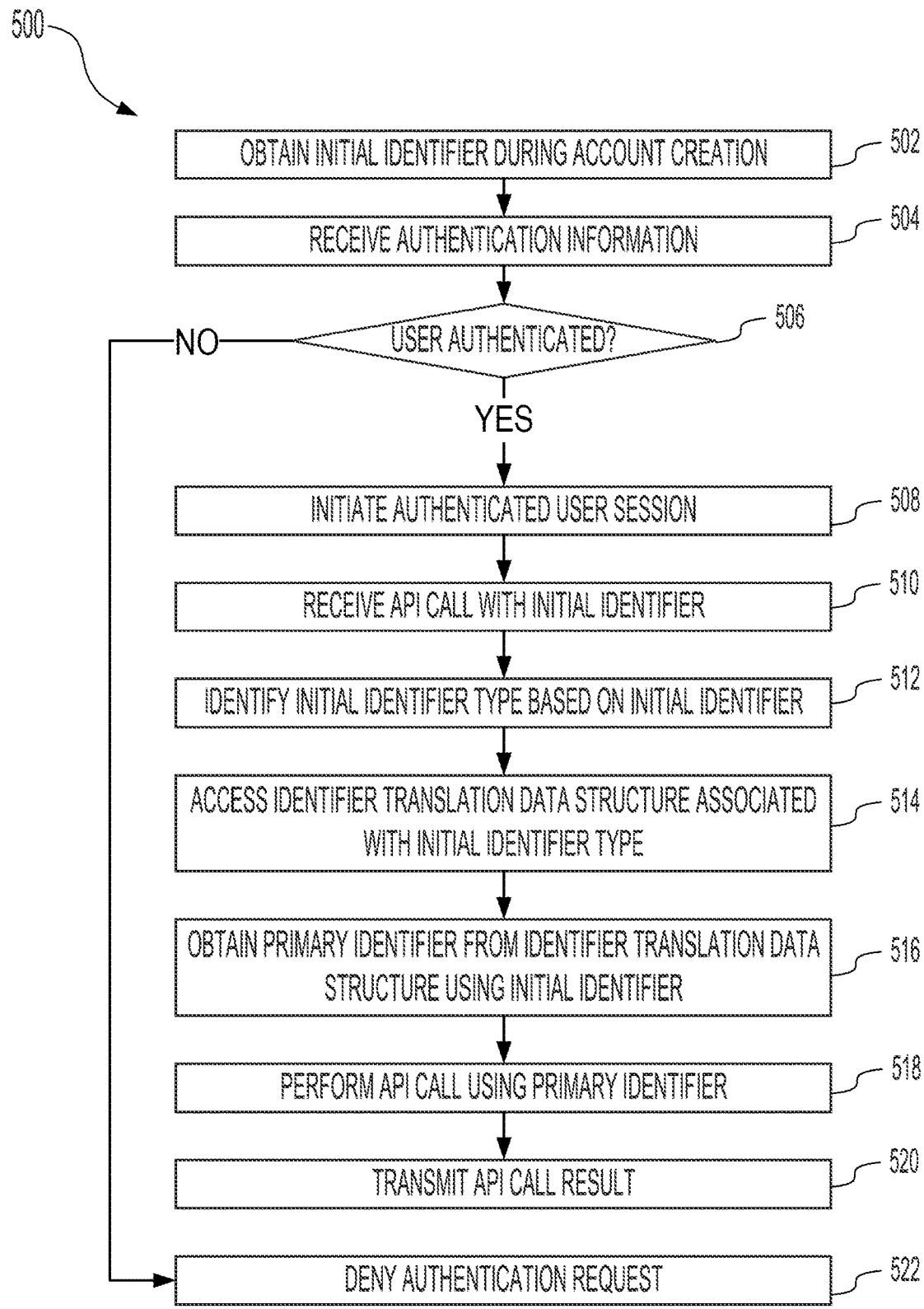
FIG. 5 shows an illustrative example of a process for translating an initial identifier received as part of an API call to a primary identifier associated with a user account maintained by a service provider system in order to service the API call in accordance with one or more embodiments described herein.

FIG. 5 shows an illustrative example of a process 500 for translating an initial identifier received as part of an API call to a primary identifier associated with a user account maintained by a service provider system in order to service the API call in accordance with one or more embodiments described herein. The process 500 may be performed, for example, by a service provider system, such as service provider system 206 described above at least in conjunction with FIG. 2.

At step 502, an initial identifier is obtained during an account creation process by which a user account is created on a service provider system that is associated with a third-party (e.g., a retailer, a payment processing entity, etc.). As an example, the initial identifier may be a third-party account number. The initial identifier may be provided by the third-party with which the user account is associated, generated by the service provider system, or any combination thereof. In one or more embodiments, the service provider system also generates a primary identifier (e.g., a primary account number) that is associated with the user account, and is not exposed outside the service provider system. The user account may be an account through which a user receives one or more services of any type, such as, for example, a credit account, a store-specific credit account, a debit card account, a payment system account, a financial services account, a brokerage account, etc.

At step 504, an authentication request is received at a service provider system from a third-party application, such as third-party application 204 shown in FIG. 2 and described above. In one or more embodiments, an authentication request includes any information which may be subjected to a verification process by the service provider system in order to authenticate the user of the third-party application from which the authentication request is received. An authentication request may include an identifier associated with a user (e.g., username, email address, etc.) and one or more other information items that allow the service provider system to verify the identity of the user (i.e., authenticate the user). As an example, the service provider system may employ single factor authentication and require a username and password. As another example, the authentication request may include biometric information (e.g., facial scan, fingerprint, iris scan, etc.) of the user. An authentication request may include any number of discrete steps without departing from the scope of embodiments described herein. As an example, a user, via the third-party application, may provide a username and password as part of the authentication request to the service provider system. However, the service provider system may additionally check whether the user device on which the user accesses the third-party application is recognized by the service provider system (e.g., the user has previously been authenticated when using the third-party application on the user device). When the user device is not recognized, the service provider system may require additional information to authenticate the user (e.g., multifactor authentication), such as providing a unique code provided to a separate device associated with the user (e.g., a user mobile device (not shown)).

At step 506, a determination is made as to whether the user associated with the authentication request received in Step 504 is authenticated. In one or more embodiments, the authentication is performed by an API gateway (e.g., the API gateway 208 shown in FIG. 2 and described above) of the service provider system using one or more API calls to an authentication sub-system of the service provider system. In one or more embodiments, the authentication sub-system includes and/or has access to one or more data structures that may be used to authenticate a user in response to an authentication request. As an example, an authentication request may include a username and passcode. The authentication sub-system may include a data structure that includes usernames associated with a hash of a passcode corresponding to the username. The API gateway may make an API call to the authentication sub-system that includes the username and passcode, and the authentication sub-system performs a hash of the passcode. The result may then be compared with the hash in the data structure to determine if there is a match, which, if so, indicates the passcode is correct. Similar series of events may occur using information other than passcodes without departing from the scope of embodiments described herein. As an example, a different form of information may be provided as part of the authentication request API call from the API gateway to the authentication sub-system, such as biometric information (e.g., face scan information, fingerprint information, iris scan information, etc.), or information gained from a card swiped on or inserted into the user device by a user.

In one or more embodiments, authenticating a user may require additional steps in response to an authentication request. As an example, the user may be required to perform multi-factor authentication, which may, for example, require that the user access a separate application on a separate mobile device of the user to interact with an interactive element within the application to further verify the identity of the user. As another example, the service provider system be configured to determine whether the user device from which the authentication request originated is a recognized device associated with the user. If the user device is not recognized, the user may be asked for a communication channel (e.g. email, text message) to which the service provider system may transmit a one-time code, which the user must obtain and enter in order to become authenticated. The authentication techniques described herein, and any other authentication techniques, may be used in any combination in order to authenticate a user of a third-party application. As an example, multi-factor authentication (e.g., password, then biometric information, then answering a pre-determined security question (e.g., "What street did you grow up on?")) and further verification of an unrecognized user device may be required for determining if a user is authenticated.

In one or more embodiments, if the user is cannot be authenticated, the process proceeds to step 522. In step 522, the authentication request is denied, and the denial is transmitted to the user device from which the authentication request was received. The denial may be accompanied by an invitation to the user to retry the authentication request. As an example, if the passcode could not be verified, the denial of the authentication request may include an indication that the passcode was incorrect, and invite the user to provide the correct passcode. In one or more embodiments, when the user is successfully authenticated, the process proceeds to step 508.

At step 508, based on the successful authentication of the user in step 506, an authenticated user session is initiated. In one or more embodiments, the authenticated user session is initiated by transmitting an indication of successful authentication to the third-party application from which the authentication request was received in step 504. In one or more embodiments, initiating an authenticated user session may also include other steps, such as receiving a request from the third-party application for an access token. For example, the indication of successful authentication may be provided to the user application along with a code, and the user application may use the code to request an access token.

At step 510, an API call is received from a third-party application at a service provider system. In one or more embodiments, an API call is a request made to an API for one or more actions to be performed. Such actions may include, but are not limited to, obtaining information (e.g., accessing account information for one or more accounts), updating information, deleting information, executing a method, process, function, etc. As an example, the service provider may be an entity that provides any number of user accounts for credit cards, bank accounts, etc., and API calls may be made by the third-party application to the service provider system to perform actions such as accessing account information, updating account information, viewing account summaries and account details, viewing payment history, viewing account balances, making payments, filing disputes, etc. In one or more embodiments, the API call includes an account identifier field that includes the initial identifier.

At step 512, the initial identifier included in the API call received in step 510 is used to determine an initial identifier type. In one or more embodiments, the API gateway of the service provider system assesses the initial identifier to determine the initial identifier type. In one or more embodiments, the initial identifier type is an initial identifier obtained by the service provider during the account creation process for the user account, or any time thereafter if the initial identifier was changed at any time during the existence of the account (e.g., by the third-party with which the account is associated). The initial identifier type may be identified based on the form and/or content of the initial identifier. Additionally or alternatively, the initial identifier type may be identified based on having been received as part of an API call from a third-party application associated with a specific third-party (e.g., a particular retailer).

In an embodiment, the initial identifier type is automatically encoded into the initial identifier generated by the service provider system according to the third-party application or corresponding third-party that publishes or otherwise provides the third-party application. For example, when the third-party application transmits an authentication request to the service provider system, the third-party application may provide identifying information associated with the third-party application and/or with the third-party that provides the third-party application. For instance, the third-party application may provide the name of the third-party application, information corresponding to the creator or issuer of the third-party application (e.g., a third-party, etc.), the version of the third-party application, and the like. Based on this information, the service provider system may generate and assign an initial identifier type for the initial identifier to be provided to the third-party application.

In an embodiment, the service provider system can automatically designate a particular initial identifier type according to the third-party application and/or third-party that provided the third-party application to which an initial identifier is to be provided. For example, if the initial identifier includes a string of alphanumeric or other special characters that are used to uniquely, or substantially uniquely, identify a user account from among other user accounts maintained by the service provider system, a pre-defined number of alphanumeric or other special characters may be reserved to define the initial identifier type for the initial identifier. The service provider system may automatically assign a unique character string for each of the initial identifier types and accordingly use the unique character string corresponding to the identified initial identifier type for inclusion in the initial identifier. The remaining characters of the initial identifier may be associated with the user account to which the initial identifier is associated.

In some instances, the service provider system may designate a particular initial identifier configuration according to each of the different third-party applications and/or corresponding third-parties that interact with the service provider system. For example, for a particular third-party application, the service provider system may generate version 4 UUIDs having a pre-defined set of characteristics (e.g., one or more characters having fixed values that may be uniquely associated with the particular third-party application, etc.). However, for a different third-party application, the service provider system may alternatively generate version 1 UUIDs. Thus, according to the third-party application and/or third-party associated with the authentication request, the service provider system may determine the configuration of the initial identifier that is to be provided to the third-party application. This configuration of the initial identifier, thus, may serve as the initial identifier type usable to identify the corresponding identifier translation data structure.

At step 514, based on the initial identifier type determined in step 512, an identifier translation data structure associated with the initial identifier type is accessed. In one or more embodiments, there may be any number of different types of initial identifiers, and each type may be associated with a separate identifier translation data structure.

At step 516, a primary identifier is obtained from the identifier translation data structure accessed in step 514. In one or more embodiments, the API gateway of the service provider system uses the identifier translation data structure to perform a translation request to obtain the primary identifier. In one or more embodiments, a translation request includes using the initial identifier obtained from the API call received from the user application to obtain the primary identifier associated with the initial identifier from the identifier translation data structure. As an example, the initial identifier may be used as a key to look up, in an in-memory database, a value that is the primary identifier associated with the initial identifier. Said another way, the API gateway obtains the primary identifier from the identifier translation data structure corresponding to the initial identifier type by using the initial identifier to obtain the primary identifier.

At step 518, an API action is performed based on the API call and using the primary identifier obtained in step 516. The API action may be performed using service provider resource(s). The API call may be requesting an API action to retrieve information, update information, delete information, add additional information, etc. In one or more embodiments, the API gateway of the service provider system performs the API action requested by the API call using the service provider resource(s) to obtain an API call result. As an example, if the API call was a request for information (e.g., a user account summary, rewards feature balance, etc.), the API call result may include the requested information. As another example, if the API call was a request to update information (e.g., update an address associated with the user account), the API call result may include a confirmation that the information was successfully updated. As another example, if the API call was a request that a certain action be performed (e.g., a payment be made towards the balance of a credit account), then the API call result may include a confirmation that the action was performed. In one or more embodiments, the API call result may also include a field for an account identifier. However, in one or more embodiments, the service provider system is configured to not transmit the primary identifier used to perform the API action outside the service provider system. Therefore, in one or more embodiments, the service provider replaces the primary identifier with the initial identifier obtained from the API call in any account identifier field of the API call result.

At step 520, the API call result, including the initial identifier in any field requiring an account identifier is then transmitted to the user application from the service provider system. In one or more embodiments, the user application then, if relevant, provides the API call result, or any portion thereof, to the user (e.g., by displaying the API call result as part of a user interface or page presented to the user on the user device). As an example, if account information was requested via the API call, the account information included in the API call result may be presented within the user application. As another example, if the API call requested that an action be performed (e.g., make a payment, update information, delete information, etc.), then a confirmation that the requested action was performed may be displayed for the user in the user application.

Figure 6:
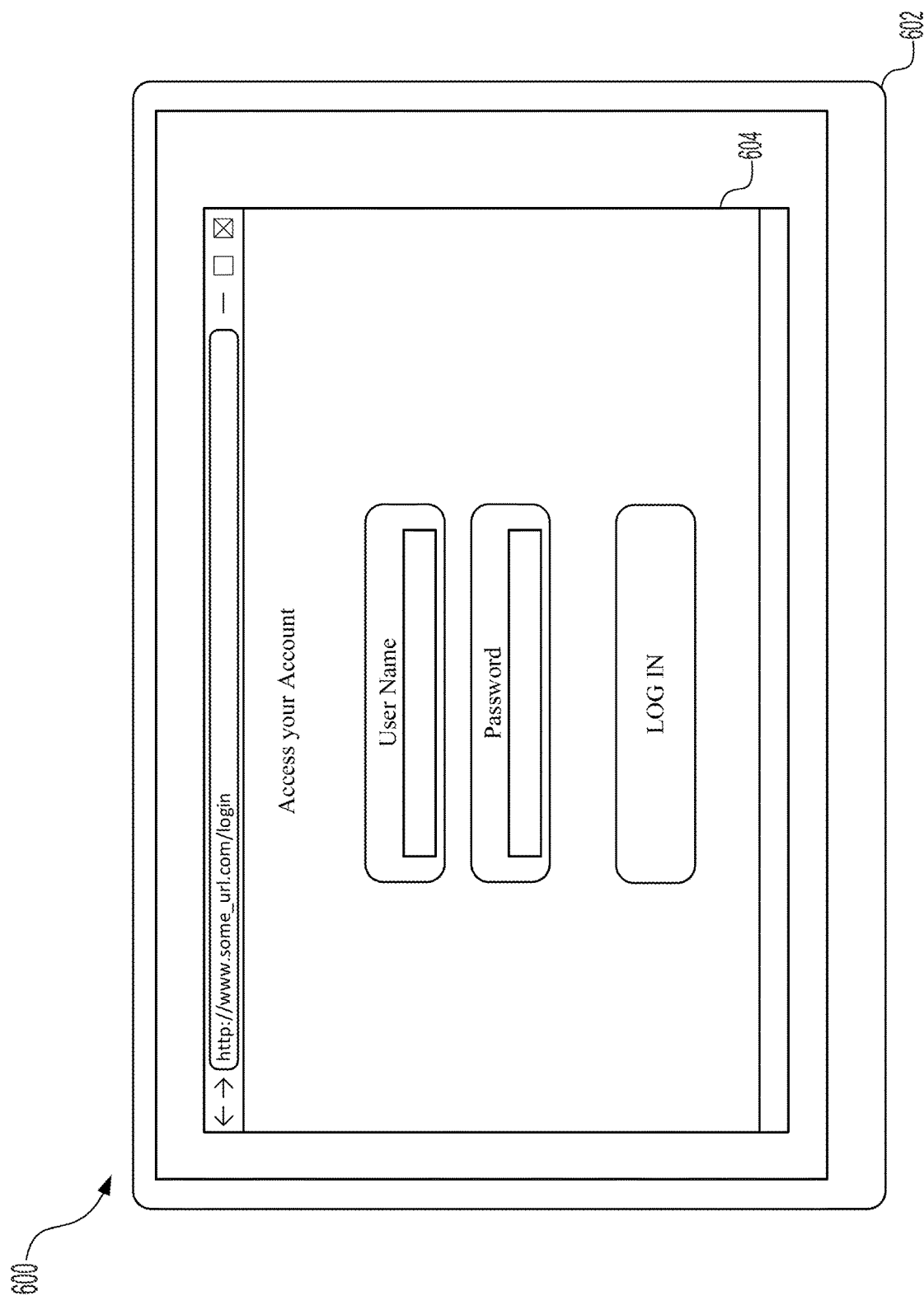
FIG. 6 shows an illustrative example of a user application executing on a user device displaying a page by which a user may initiate a user authentication process in accordance with one or more embodiments described herein.

FIG. 6 shows an illustrative example of an environment 600 in which a user application 604 executing on a user device 602 configured to interact with a service provider system (not shown) to make API calls to the service provider system using an initial identifier in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Referring to FIG. 6, consider a scenario in which a user uses a mobile computing device (i.e., user device 602) to access a single page application (SPA) (i.e., user application 604) to access a credit account that the user has with a financial services provider. In such a scenario, in order to access the service provider system, and any APIs exposed therefrom, the user is first authenticated. In the example shown in FIG. 6, the authentication process begins by the user application 604 requesting that the user enter a user name and password, and press the Log In button.

In one or more embodiments, once the user enters the user name and password, and hits the Log In button (i.e., makes an authentication request), the authentication request is transmitted to the service provider system. The service provider system makes an API call to an authentication sub-system (not shown) to determine if the user may be authenticated using the provided user name and password. The authentication sub-system uses the user name and a hash of the password to determine if a matching hash is associated with the user name in a data structure accessible by the authorization sub-system. In this scenario, the password is correct, and the user device 602 is recognized. Therefore, the user may be authenticated. Next, the service provider system sends an HTTPS 302 response to the user device 602, along with a code, which re-directs the user device to request an access token using the code. In response to the request for an access token, a JWT is issued to the user application, which includes an expiration time of 3600 seconds and a set of permissions regarding API calls that the user application may make to the service provider system.

Once the user application 604 has the access token, the service provider system generates a UUID (i.e., an initial identifier) for the user session. The service provider system then stores an association between the initial identifier and a primary identifier (e.g., a primary account number) in an identifier translation data structure. The service provider system then assigns an expiration time of 3600 seconds to the initial identifier, stores the time of generation of the initial identifier and the assigned expiration time, and transmits the initial identifier to the user application.

Figure 7:
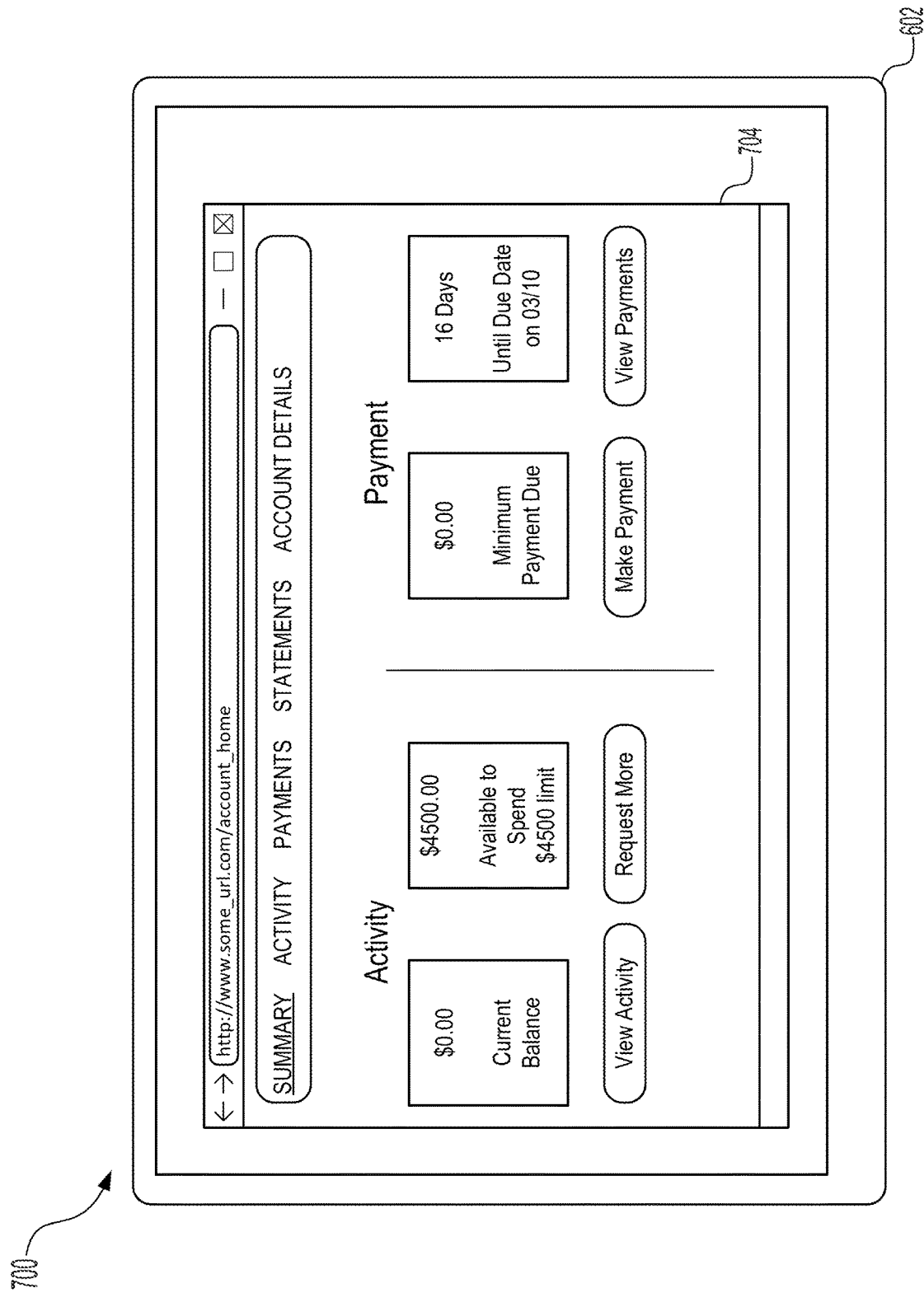
FIG. 7 shows an illustrative example of a landing page of a user application displaying account summary information obtained using an API call and an initial identifier in accordance with one or more embodiments described herein.

Next, the user application will display a landing page to the user. FIG. 7 shows an example environment 700 of a landing page 704 of the user application. In this scenario, the user has previously selected to have an account summary as the landing page after logging in to the user application. Therefore, the user application makes an API call to the service provider system to obtain the account summary information to be displayed to the user.

To make the API call, the user application first determines that the API call for account summary information requires an account identifier. Based on the aforementioned determination, the user application obtains the initial identifier received from the service provider system, and inserts the initial identifier into the account identifier field of the API call, and transmits the API call and the access token to the service provider system.

Upon receipt of the API call, the service provider system first verifies that the access token is not expired, and that the access token indicates that the user application has permission to make the API call. In this scenario, the verification succeeds. Next, the service provider system uses the time at which the API call was received, the stored generation time, and the stored generation time for the initial identifier to determine that the initial identifier is not expired. Therefore, the service provider system determines that the API call includes account identifier field, and obtains the initial identifier from the account identifier field of the API call.

Next, the service provider system determines that the type of the initial identifier is a UUID issued by the service provider system. Such a type is associated with a specific identifier translation data structure maintained by the service provider system. Accordingly, the service provider system accesses the initial identifier data structure, and uses the initial identifier to look up and obtain the primary identifier associated with the user account. The primary identifier and API call are then used to perform an API action of accessing appropriate data structures in the service provider resources to obtain the account summary information (i.e., the API call result).

Next, the service provider system transmits the API call result, along with the initial identifier received with the API call. The user application uses the user private key to decrypt the encrypted fields, and then displays the account summary information to the user, as shown in FIG. 7.

In this scenario, the user continues to use the user application to view various items of information associated with the user's account. The user may use the bar near the top of the user application user interface, or any interactive element therein, to request additional items of information to be displayed. Each such request is performed by the user application making another API call using the technique described above, and the service provider system servicing the API call, at least in part, by translating the initial identifier to a primary identifier.

3660 seconds after the user application was issued the initial identifier, the user clicks on "SUMMARY" to go back to the account summary information. The user application thus makes and API call using the initial identifier. However, the service provider system, after receiving the API call with the initial identifier, determines that the time since the initial identifier was issued (i.e., 3660 seconds) is greater than the expiration time (3600 seconds) of the access token. Therefore, the service provider system denies the API call, and sends an indication to the user application of the denial based on an expired initial identifier.

In response to the denial, the user application requests an updated initial identifier, which indicates that the user session of the user application remains active. In response, the service provider system generates an updated initial identifier, assigns an expiration time of 3600 seconds to the initial identifier, stores the generation time and expiration time associated with the initial identifier, and transmits the updated initial identifier to the user application. The service provider system discards the previous initial identifier, as does the user application. The user application then uses the updated initial identifier to re-try the API call requesting account summary information, as described above.

FIG. 8 illustrates a computing system architecture 800, including various components in electrical communication with each other, in accordance with some embodiments. The example computing system architecture 800 illustrated in FIG. 8 includes a computing device 802, which has various components in electrical communication with each other using a connection 806, such as a bus, in accordance with some implementations. The example computing system architecture 800 includes a processing unit 804 that is in electrical communication with various system components, using the connection 806, and including the system memory 814. In some embodiments, the system memory 814 includes read-only memory (ROM), random-access memory (RAM), and other such memory technologies including, but not limited to, those described herein. In some embodiments, the example computing system architecture 800 includes a cache 808 of high-speed memory connected directly with, in close proximity to, or integrated as part of the processor 804. The system architecture 800 can copy data from the memory 814 and/or the storage device 810 to the cache 808 for quick access by the processor 804. In this way, the cache 808 can provide a performance boost that decreases or eliminates processor delays in the processor 804 due to waiting for data. Using modules, methods and services such as those described herein, the processor 804 can be configured to perform various actions. In some embodiments, the cache 808 may include multiple types of cache including, for example, level one (L1) and level two (L2) cache. The memory 814 may be referred to herein as system memory or computer system memory. The memory 814 may include, at various times, elements of an operating system, one or more applications, data associated with the operating system or the one or more applications, or other such data associated with the computing device 802.

Other system memory 814 can be available for use as well. The memory 814 can include multiple different types of memory with different performance characteristics. The processor 804 can include any general purpose processor and one or more hardware or software services, such as service 812 stored in storage device 810, configured to control the processor 804 as well as a special-purpose processor where software instructions are incorporated into the actual processor design. The processor 804 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 804 can be a microprocessor, a microcontroller, a digital signal processor ("DSP"), or a combination of these and/or other types of processors. In some embodiments, the processor 804 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 800, an input device 816 can represent any number of input mechanisms, such as a microphone for speech, a touch-sensitive screen for gesture or graphical input, keyboard, mouse, motion input, pen, and other such input devices. An output device 818 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 800. In some embodiments, the input device 816 and/or the output device 818 can be coupled to the computing device 802 using a remote connection device such as, for example, a communication interface such as the network interface 820 described herein. In such embodiments, the communication interface can govern and manage the input and output received from the attached input device 816 and/or output device 818. As may be contemplated, there is no restriction on operating on any particular hardware arrangement and accordingly the basic features here may be substituted for other hardware, software, or firmware arrangements as they are developed.

In some embodiments, the storage device 810 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 810 can include hardware and/or software services such as service 812 that can control or configure the processor 804 to perform one or more functions including, but not limited to, the methods, processes, functions, systems, and services described herein in various embodiments. In some embodiments, the hardware or software services can be implemented as modules. As illustrated in example computing system architecture 800, the storage device 810 can be connected to other parts of the computing device 802 using the system connection 806. In an embodiment, a hardware service or hardware module such as service 812, that performs a function can include a software component stored in a non-transitory computer-readable medium that, in connection with the necessary hardware components, such as the processor 804, connection 806, cache 808, storage device 810, memory 814, input device 816, output device 818, and so forth, can carry out the functions such as those described herein.

The disclosed gifting service system and the associated systems and methods for providing a consumer with an option to send a gift received as the result of a purchase from a retailer to a separate recipient may be performed using a computing system such as the example computing system illustrated in FIG. 8, using one or more components of the example computing system architecture 800. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems described herein by, for example, executing code using a processor such as processor 804 wherein the code is stored in memory such as memory 814 as described herein. One or more of a user device, a provider server or system, a database system, or other such devices, services, or systems may include some or all of the components of the computing system such as the example computing system illustrated in FIG. 8, using one or more components of the example computing architecture 800 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 828. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 804 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 814 can be coupled to the processor 804 by, for example, a connector such as connector 806, or a bus. As used herein, a connector or bus such as connector 806 is a communications system that transfers data between components within the computing device 802 and may, in some embodiments, be used to transfer data between computing devices. The connector 806 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 814 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 814 can also include magnetic or optical data storage media including read-only (e.g., CD ROM and DVD ROM) or otherwise (e.g., CD or DVD). The memory can be local, remote, or distributed.

As described herein, the connector 806 (or bus) can also couple the processor 804 to the storage device 810, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 810. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 806 can also couple the processor 804 to a network interface device such as the network interface 820. The interface can include one or more of a modem, network interface card (NIC), or other such network interfaces including, but not limited to those described herein. It will be appreciated that the network interface 820 may be considered to be part of the computing device 802 or may be separate from the computing device 802. The network interface 820 can include one or more of an analog modem, Integrated Services Digital Network (ISDN) modem, cable modem, token ring interface, satellite transmission interface, or other interfaces for coupling a computer system to other computer systems. In some embodiments, the network interface 820 can include one or more input and/or output (I/O) devices. The I/O devices can include, by way of example but not limitation, input devices such as input device 816 and/or output devices such as output device 818. For example, the network interface 820 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™ SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 802 can be connected to one or more additional computing devices such as computing device 824 via a network 822 using a connection such as the network interface 820. In such embodiments, the computing device 824 may execute one or more services 826 to perform one or more functions under the control of, or on behalf of, programs and/or services operating on computing device 802. In some embodiments, a computing device such as computing device 824 may include one or more of the types of components as described in connection with computing device 802 including, but not limited to, a processor such as processor 804, a connection such as connection 806, a cache such as cache 808, a storage device such as storage device 810, memory such as memory 814, an input device such as input device 816, and an output device such as output device 818. In such embodiments, the computing device 824 can carry out the functions such as those described herein in connection with computing device 802. In some embodiments, the computing device 802 can be connected to a plurality of computing devices such as computing device 824, each of which may also be connected to a plurality of computing devices such as computing device 824. Such an embodiment may be referred to herein as a distributed computing environment.

The network 822 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 822 can be wired connections, wireless connections, or combinations thereof. Communications via the network 822 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 822, within the computing device 802, within the computing device 824, or within the computing resources provider 828 can include information, which also may be referred to herein as content. The information may include text, graphics, audio, video, haptics, and/or any other information that can be provided to a user of the computing device such as the computing device 802. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 802 and presented to a user of the computing device 802 using forms that are perceptible via sight, sound, smell, taste, touch, or other such mechanisms. In some embodiments, communications over the network 822 can be received and/or processed by a computing device configured as a server. Such communications can be sent and received using PUP: Hypertext Preprocessor ("PUP"), Python™, Ruby, Perl® and variants, Java®, HTML, XML, or another such server-side processing language.

In some embodiments, the computing device 802 and/or the computing device 824 can be connected to a computing resources provider 828 via the network 822 using a network interface such as those described herein (e.g. network interface 820). In such embodiments, one or more systems (e.g., service 830 and service 832) hosted within the computing resources provider 828 (also referred to herein as within "a computing resources provider environment") may execute one or more services to perform one or more functions under the control of, or on behalf of, programs and/or services operating on computing device 802 and/or computing device 824. Systems such as service 830 and service 832 may include one or more computing devices such as those described herein to execute computer code to perform the one or more functions under the control of, or on behalf of, programs and/or services operating on computing device 802 and/or computing device 824.

For example, the computing resources provider 828 may provide a service, operating on service 830 to store data for the computing device 802 when, for example, the amount of data that the computing device 802 attempts to store exceeds the capacity of storage device 810. In another example, the computing resources provider 828 may provide a service to first instantiate a virtual machine (VM) on service 832, use that VM to access the data stored on service 832, perform one or more operations on that data, and provide a result of those one or more operations to the computing device 802. Such operations (e.g., data storage and VM instantiation) may be referred to herein as operating "in the cloud," "within a cloud computing environment," or "within a hosted virtual machine environment," and the computing resources provider 828 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 828 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 830 and service 832 may implement versions of various services (e.g., the service 812 or the service 826) on behalf of, or under the control of, computing device 802 and/or computing device 824. Such implemented versions of various services may involve one or more virtualization techniques so that, for example, it may appear to a user of computing device 802 that the service 812 is executing on the computing device 802 when the service is executing on, for example, service 830. As may also be contemplated, the various services operating within the computing resources provider 828 environment may be distributed among various systems within the environment as well as partially distributed onto computing device 824 and/or computing device 802.

In an embodiment, the computing device 802 can be connected to one or more additional computing devices and/or services such as merchant computing device 836 and/or a point-of-sale service 834 via the network 822 and using a connection such as the network interface 820. In an embodiment, the point-of-sale service 834 is separate from the merchant computing device 836. In an embodiment, the point-of-sale service 834 is executing on the merchant computing device 836. In an embodiment, the point-of-sale service 834 is executing as one or more services (e.g., the service 830 and/or the service 832) operating within the environment of the computing resources provider. As used herein, a point-of-sale service 834 is a service used by one or more merchants to manage sales transactions for customers, to process payment transactions for customers (e.g., credit card transactions), to manage inventory for merchants, to identify customers based on, for example, customer loyalty programs, and other such tasks.

In an embodiment, a customer and/or a merchant uses the merchant computing device 836 to interact with the point-of-sale service 834. In an embodiment, the merchant computing device 836 is a dedicated point-of-service (POS)

terminal. In an embodiment, the merchant computing device 836 is a cash register system. In an embodiment, the merchant computing device 836 is an application or web service operating on a computing device such as the computing device 802 described herein. In such an embodiment, the application or web service may be provided by a financial services system (e.g., a bank, a transaction processing system, an inventory management system, or some other such financial services system). In an embodiment, the merchant computing device 836 includes an auxiliary device or system to execute tasks associated with the point-of-sale service 834 (e.g., a credit card processing device attached to a smart phone or tablet). In an embodiment, the merchant computing device 836 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor or retailer. In an embodiment, the merchant computing device 836 is a virtual device (e.g., a virtual kiosk) such as the virtual devices described herein. Although not illustrated here, in an embodiment, the merchant computing device 836 may be one of a plurality of devices that may be interconnected using a network such as the network 822.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to store data temporarily or permanently. A network interface, such as a wireless or wired interface, can enable the computing device to communicate with a network. Examples of computing devices (e.g., the computing device 802) include, but are not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram. Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 802.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to illustrate embodiments more clearly and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

What is claimed is:

1. A computer-implemented method, comprising:
receiving an authentication request, wherein the authentication request includes one or more identifiers associated with a user, and wherein the user is associated with a set of accounts;
dynamically generating a set of initial identifiers, wherein an initial identifier is uniquely associated with a primary identifier corresponding to an account from the set of accounts, and wherein the set of initial identifiers are dynamically generated as a result of the authentication request being fulfilled;
providing the set of initial identifiers, wherein the set of initial identifiers are provided without exposing primary identifiers associated with the set of accounts;
receiving an application programming interface (API) call, wherein the API call includes a request to perform an API action corresponding to a particular account from the set of accounts, and wherein the API call includes a particular initial identifier corresponding to the particular account;
obtaining a particular primary identifier from an identifier translation data structure using the initial identifier, wherein the particular primary identifier is associated with the particular account;
performing the API call using the particular primary identifier to obtain an API call result; and
modifying the API call result to replace the particular primary identifier with the particular initial identifier, wherein when the particular primary identifier is replaced with the particular initial identifier in the API call result, the API call result is provided.

2. The computer-implemented method of claim 1, wherein the particular initial identifier includes a universally unique identifier (UUID).

3. The computer-implemented method of claim 1, wherein the particular initial identifier is associated with an expiration time, and wherein when the expiration time has elapsed, the particular initial identifier is automatically expired.

4. The computer-implemented method of claim 1, wherein the particular initial identifier expires when a user session associated with the particular initial identifier expires.

5. The computer-implemented method of claim 1, further comprising, after performing the API call:
determining that the particular initial identifier is expired; and
issuing an updated initial identifier when a user session associated with the particular initial identifier remains active.

6. The computer-implemented method of claim 1, wherein the particular account is maintained by a separate entity associated with the user.

7. The computer-implemented method of claim 1, wherein the particular primary identifier includes a primary account number associated with the particular account.

8. The computer-implemented method of claim 1, wherein the API call result includes updated information associated with the particular account, and wherein the particular primary identifier is replaced in the updated information with the particular initial identifier.

9. The computer-implemented method of claim 1, wherein the API call result includes retrieved information associated with the particular account, and wherein the particular primary identifier is replaced in the retrieved information with the particular initial identifier.

10. The computer-implemented method of claim 1, wherein the API call result includes making a payment associated with the particular account.

11. A system, comprising:
one or more processors; and
memory storing thereon instructions that, as a result of being executed by the one or more processors, cause the system to:
receive an authentication request, wherein the authentication request includes one or more identifiers associated with a user, and wherein the user is associated with a set of accounts;
dynamically generate a set of initial identifiers, wherein an initial identifier is uniquely associated with a primary identifier corresponding to an account from the set of accounts, and wherein the set of initial identifiers are dynamically generated as a result of the authentication request being fulfilled;
provide the set of initial identifiers, wherein the set of initial identifiers are provided without exposing primary identifiers associated with the set of accounts;
receive an application programming interface (API) call, wherein the API call includes a request to perform an API action corresponding to a particular account from the set of accounts, and wherein the API call includes a particular initial identifier corresponding to the particular account;
obtain a particular primary identifier from an identifier translation data structure using the initial identifier, wherein the particular primary identifier is associated with the particular account;
perform the API call using the particular primary identifier to obtain an API call result; and
modifying the API call result to replace the particular primary identifier with the particular initial identifier, wherein when the particular primary identifier is replaced with the particular initial identifier in the API call result, the API call result is provided.

12. The system of claim 11, wherein the particular initial identifier includes a universally unique identifier (UUID).

13. The system of claim 11, wherein the particular initial identifier is associated with an expiration time, and wherein when the expiration time has elapsed, the particular initial identifier is automatically expired.

14. The system of claim 11, wherein the particular initial identifier expires when a user session associated with the particular initial identifier expires.

15. The system of claim 11, wherein the instructions further cause the system to, after performing the API call:
determine that the particular initial identifier is expired; and
issue an updated initial identifier, wherein the updated initial identifier is issued when a user session associated with the particular initial identifier remains active.

16. The system of claim 11, wherein the particular account is associated with a third-party entity associated with the user.

17. The system of claim 11, wherein the particular primary identifier includes a primary account number associated with the particular account.

18. The system of claim 11, wherein the API call result includes updated information associated with the particular account, and wherein the particular primary identifier is replaced in the updated information with the particular initial identifier.

19. The system of claim 11, wherein the API call result includes retrieved information associated with the particular account, and wherein the particular primary identifier is replaced in the retrieved information with the particular initial identifier.

20. The system of claim 11, wherein the API call result includes making a payment associated with the particular account.

21. A non-transitory, computer-readable storage medium storing thereon executable instructions that, as a result of being executed by a computer system, cause the computer system to:
receive an authentication request, wherein the authentication request includes one or more identifiers associated with a user, and wherein the user is associated with a set of accounts;
dynamically generate a set of initial identifiers, wherein an initial identifier is uniquely associated with a primary identifier corresponding to an account from the set of accounts, and wherein the set of initial identifiers are dynamically generated as a result of the authentication request being fulfilled;
provide the set of initial identifiers, wherein the set of initial identifiers are provided without exposing primary identifiers associated with the set of accounts;
receive an application programming interface (API) call, wherein the API call includes a request to perform an API action corresponding to a particular account from the set of accounts, and wherein the API call includes a particular initial identifier corresponding to the particular account;
obtain a particular primary identifier from an identifier translation data structure using the initial identifier, wherein the particular primary identifier is associated with the particular account;
perform the API call using the particular primary identifier to obtain an API call result; and
modify the API call result to replace the particular primary identifier with the particular initial identifier, wherein when the particular primary identifier is replaced with the particular initial identifier in the API call result, the API call result is provided.

22. The non-transitory, computer-readable storage medium of claim 21, wherein the particular initial identifier includes a universally unique identifier (UUID).

23. The non-transitory, computer-readable storage medium of claim 21, wherein the particular initial identifier is associated with an expiration time, and wherein when the expiration time has elapsed, the particular initial identifier is automatically expired.

24. The non-transitory, computer-readable storage medium of claim 21, wherein the particular initial identifier expires when a user session associated with the particular initial identifier expires.

25. The non-transitory, computer-readable storage medium of claim 21, wherein the executable instructions further cause the computer system to, after performing the API call:
determine that the particular initial identifier is expired; and
issue an updated initial identifier, wherein the updated initial identifier is issued when a user session associated with the particular initial identifier remains active.

26. The non-transitory, computer-readable storage medium of claim 21, wherein the particular account is associated with a third-party entity associated with the user.

27. The non-transitory, computer-readable storage medium of claim 21, wherein the particular primary identifier includes a primary account number associated with the particular account.

28. The non-transitory, computer-readable storage medium of claim 21, wherein the API call result includes updated information associated with the particular account, and wherein the particular primary identifier is replaced in the updated information with the particular initial identifier.

29. The non-transitory, computer-readable storage medium of claim 21, wherein the API call result includes retrieved information associated with the particular account, and wherein the particular primary identifier is replaced in the retrieved information with the particular initial identifier.

30. The non-transitory, computer-readable storage medium of claim 21, wherein the API call result includes making a payment associated with the particular account.

* * * * *